United States Patent
Chiba et al.

(10) Patent No.: US 12,318,921 B2
(45) Date of Patent: Jun. 3, 2025

(54) PROCESSING SYSTEM, ROBOT SYSTEM, CONTROL DEVICE, PROCESSING METHOD, CONTROL METHOD, AND STORAGE MEDIUM

(71) Applicants: KABUSHIKI KAISHA TOSHIBA, Tokyo (JP); TOSHIBA INFRASTRUCTURE SYSTEMS & SOLUTIONS CORPORATION, Kawasaki (JP)

(72) Inventors: Yasunori Chiba, Yokohama (JP); Hiromasa Takahashi, Minato (JP); Masahiro Saito, Yokohama (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 337 days.

(21) Appl. No.: 17/867,956

(22) Filed: Jul. 19, 2022

(65) Prior Publication Data

US 2023/0012625 A1 Jan. 19, 2023

(30) Foreign Application Priority Data

Jul. 19, 2021 (JP) ................. 2021-118966

(51) Int. Cl.
*B25J 19/02* (2006.01)
*B23K 31/12* (2006.01)
(Continued)

(52) U.S. Cl.
CPC ........... *B25J 19/026* (2013.01); *B25J 9/1653* (2013.01); *G01N 29/043* (2013.01);
(Continued)

(58) Field of Classification Search
CPC ..... B25J 19/026; B25J 9/1653; G01N 29/043; G01N 29/069; G01N 29/11; G01N 29/225;
(Continued)

(56) References Cited

U.S. PATENT DOCUMENTS 8,811,721 B2 * 8/2014 Matsumoto .......... G01N 29/069
424/9.1
2008/0210009 A1 9/2008 Tanishiki
(Continued)

FOREIGN PATENT DOCUMENTS

CA 2975417 C * 3/2020 ............. B60R 11/00
CN 101120248 A 2/2008
(Continued)

OTHER PUBLICATIONS

CA-2975417-C, English Translation (Year: 2020).*
(Continued)

*Primary Examiner* — Ryan D Walsh
(74) *Attorney, Agent, or Firm* — Oblon, McClelland, Maier & Neustadt, L.L.P.

(57) ABSTRACT

According to one embodiment, a processing system sets a detector to a prescribed position. The detector includes a plurality of detection elements arranged along a first direction and a second direction. The second direction crosses the first direction. The processing system causes the detector to perform a probe of a weld portion of a joined body. The probe includes a transmission of an ultrasonic wave and a detection of a reflected wave. The processing system calculates a center position of the weld portion in a first plane along the first and second directions based on intensity data. The intensity data is of an intensity of the reflected wave obtained by the probe. The processing system performs a position adjustment of moving the detector along the first (Continued)

plane to reduce a distance between the center position and a position of the detector in the first plane.

20 Claims, 18 Drawing Sheets

(51) Int. Cl.
| | | |
|---|---|---|
| *B25J 9/16* | (2006.01) | |
| *G01N 29/04* | (2006.01) | |
| *G01N 29/06* | (2006.01) | |
| *G01N 29/11* | (2006.01) | |
| *G01N 29/22* | (2006.01) | |
| *G01N 29/265* | (2006.01) | |

(52) U.S. Cl.
CPC ........... *G01N 29/069* (2013.01); *G01N 29/11* (2013.01); *G01N 29/225* (2013.01); *G01N 29/265* (2013.01); *B23K 31/125* (2013.01); *G01N 2291/0234* (2013.01); *G01N 2291/044* (2013.01); *G01N 2291/106* (2013.01); *G01N 2291/267* (2013.01); *G05B 2219/37217* (2013.01)

(58) Field of Classification Search
CPC ......... G01N 29/265; G01N 2291/0234; G01N 2291/044; G01N 2291/106; G01N 2291/267; B23K 31/125; G05B 2219/37217
See application file for complete search history.

(56) References Cited

U.S. PATENT DOCUMENTS

| | | | | |
|---|---|---|---|---|
| 2009/0132181 A1* | 5/2009 | Girndt | ................. | G01N 27/902 |
| | | | | 702/39 |
| 2011/0083512 A1* | 4/2011 | Imbert | ................... | G01N 29/27 |
| | | | | 73/622 |
| 2011/0102429 A1* | 5/2011 | Matsumoto | .......... | G01N 29/069 |
| | | | | 382/154 |
| 2016/0231291 A1* | 8/2016 | Boulware | ............. | G01N 29/24 |
| 2019/0160662 A1* | 5/2019 | Satou | ....................... | B25J 9/163 |
| 2020/0003735 A1 | 1/2020 | Ushijima et al. | | |
| 2020/0018727 A1 | 1/2020 | Ono et al. | | |
| 2020/0271627 A1* | 8/2020 | Battenberg | ............. | B25J 9/1666 |
| 2020/0363377 A1 | 11/2020 | Saito et al. | | |
| 2021/0063354 A1* | 3/2021 | Saito | .................... | G01N 29/226 |
| 2023/0020518 A1* | 1/2023 | Chiba | ................... | B25J 9/1679 |
| 2023/0024687 A1* | 1/2023 | Saito | ...................... | B23K 11/255 |
| 2024/0149380 A1* | 5/2024 | Takahashi | ............... | G01N 29/44 |

FOREIGN PATENT DOCUMENTS

| | | | | |
|---|---|---|---|---|
| CN | 111193072 A | | 5/2020 | |
| CN | 111948285 A | | 11/2020 | |
| EP | 3492214 A1 | | 6/2019 | |
| JP | 2001105138 A | | 4/2001 | |
| JP | 2003270222 A | * | 9/2003 | ............. G01N 29/07 |
| JP | 2004-17088 A | | 1/2004 | |
| JP | 2007-278809 A | | 10/2007 | |
| JP | 6570600 B2 | | 9/2019 | |
| JP | 2019-184620 A | | 10/2019 | |
| JP | 2020-008452 A | | 1/2020 | |
| JP | 2020-038218 A | | 3/2020 | |
| JP | 6805289 B2 | | 12/2020 | |

OTHER PUBLICATIONS

JP-2003270222-A, English Translation (Year: 2003).*
Office Action dated Mar. 28, 2025, issued in corresponding Chinese patent application No. 202210832731.7 (with English translation).

* cited by examiner

PROCESSING SYSTEM, ROBOT SYSTEM, CONTROL DEVICE, PROCESSING METHOD, CONTROL METHOD, AND STORAGE MEDIUM

CROSS-REFERENCE TO RELATED APPLICATIONS

This application is based upon and claims the benefit of priority from Japanese Patent Application No. 2021-118966, filed on Jul. 19, 2022; the entire contents of which are incorporated herein by reference.

FIELD

Embodiments described herein relate generally to a processing system, a robot system, a control device, a processing method, a control method, and a storage medium.

BACKGROUND

There is a robot that inspects a joined body. It is desirable to increase the inspection accuracy of such a robot.

DETAILED DESCRIPTION

Figure 1:
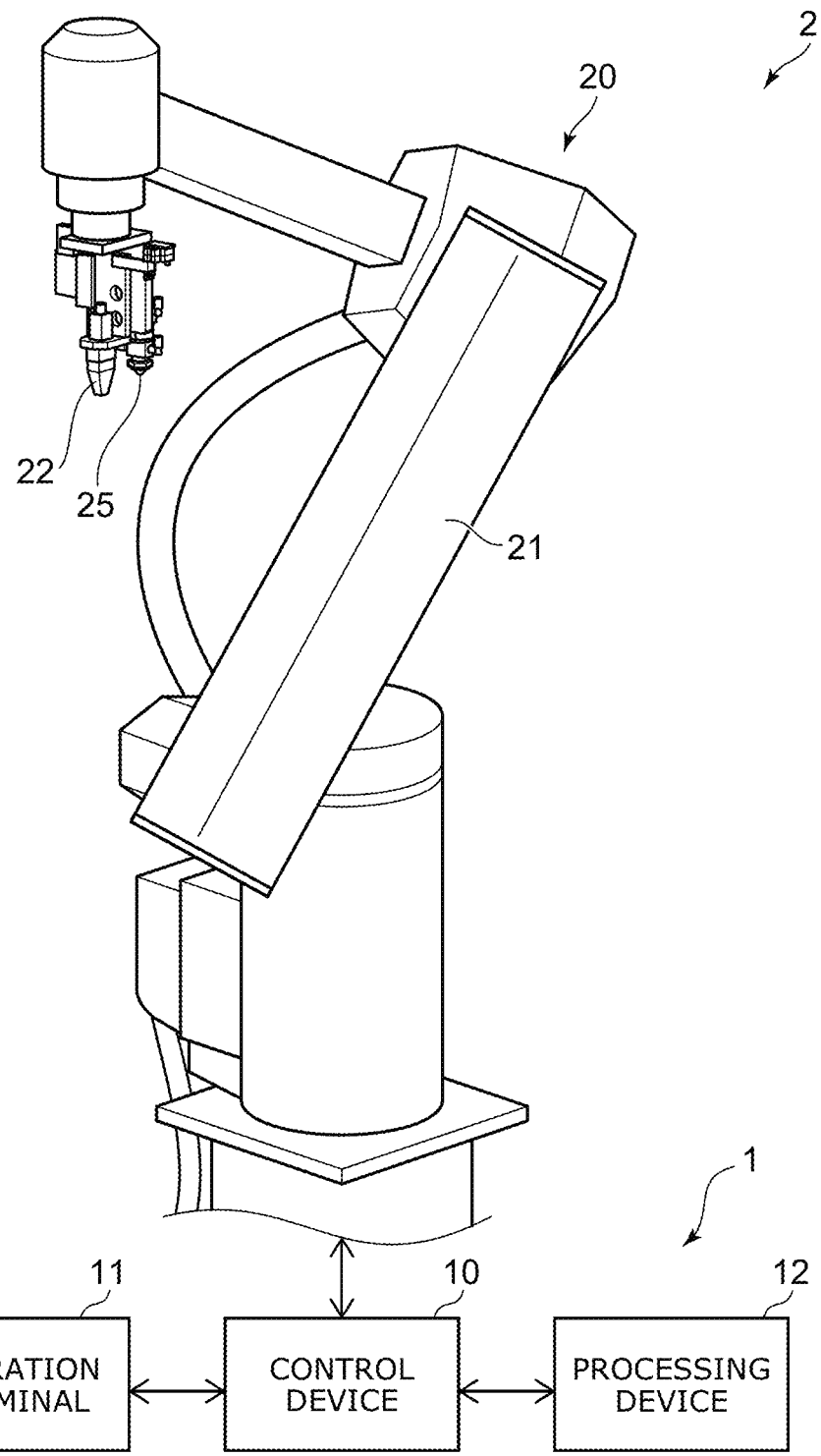
FIG. 1 is a schematic view showing a robot system according to an embodiment.

According to one embodiment, a processing system sets a detector to a prescribed position. The detector includes a plurality of detection elements arranged along a first direction and a second direction. The second direction crosses the first direction. The processing system causes the detector to perform a probe of a weld portion of a joined body. The probe includes a transmission of an ultrasonic wave and a detection of a reflected wave. The processing system calculates a center position of the weld portion in a first plane along the first and second directions based on intensity data. The intensity data is of an intensity of the reflected wave obtained by the probe. The processing system performs a position adjustment of moving the detector along the first plane to reduce a distance between the center position and a position of the detector in the first plane. A reference distance is calculated using a movement distance of the detector for a plurality of previous position adjustments. The prescribed position is corrected using at least a portion of a plurality of the movement distances when the reference distance is greater than a first threshold.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIG. 1 is a schematic view showing a robot system according to an embodiment.

As shown in FIG. 1, the robot system 2 according to the embodiment includes a processing system 1 and a robot 20. The processing system 1 includes a control device 10, an operation terminal 11, and a processing device 12.

The control device 10 controls operations of the robot 20. The control device 10 is a so-called robot controller. The control device 10 includes a control circuit, a servo controller, a power supply device, etc. The control device 10 controls operations of the robot 20 by controlling servo motors of each axis according to a prestored operation program, teaching data set by the operation terminal 11, etc.

The operation terminal 11 is a terminal device for operating the robot 20. The operation terminal 11 is a so-called teaching pendant. The operation terminal 11 is connected with the control device 10 and accepts input of the operation program of the robot 20, input of settings, etc. For example, the control device 10 and the operation terminal 11 are connected via a wired cable, wireless communication, or a network. Also, the user uses the operation terminal 11 to modify, correct, or generate new teaching data, etc. Teaching data is data for teaching the operations of the robot 20 to the robot 20.

The robot 20 includes a manipulator 21, and a detector 22 mounted to the manipulator 21. For example, the manipulator 21 is vertical articulated. The detector 22 is located at the distal end of the manipulator 21 as an end effector. The manipulator 21 may be horizontal articulated or parallel link. The manipulator 21 may include a combination of two or more selected from vertical articulated, horizontal articulated, and parallel link. It is favorable for the manipulator 21 to have not less than six degrees of freedom.

The detector 22 performs a probe (probing) of the object. The probe includes transmitting an ultrasonic wave toward the object and detecting (receiving) a reflected wave. The detector 22 acquires intensity data of the intensity of the reflected wave by the probe. The detector 22 transmits the intensity data to the processing device 12 connected with the control device 10. For example, the control device 10 and the processing device 12 are connected via a wired cable, wireless communication, or a network.

In the example of FIG. 1, a dispenser 25 also is included as an end effector. The dispenser 25 dispenses a couplant liquid onto the surface of the object.

The object of the probe is a joined body joined by welding multiple members. The multiple members are joined at a weld portion. The processing device 12 processes intensity data and acquires data related to the weld portion. For example, the processing device 12 uses the intensity data to perform inspection processing of the weld portion. The robot system 2 performs the inspection processing for multiple joined bodies 50 of the same type.

Figure 2:
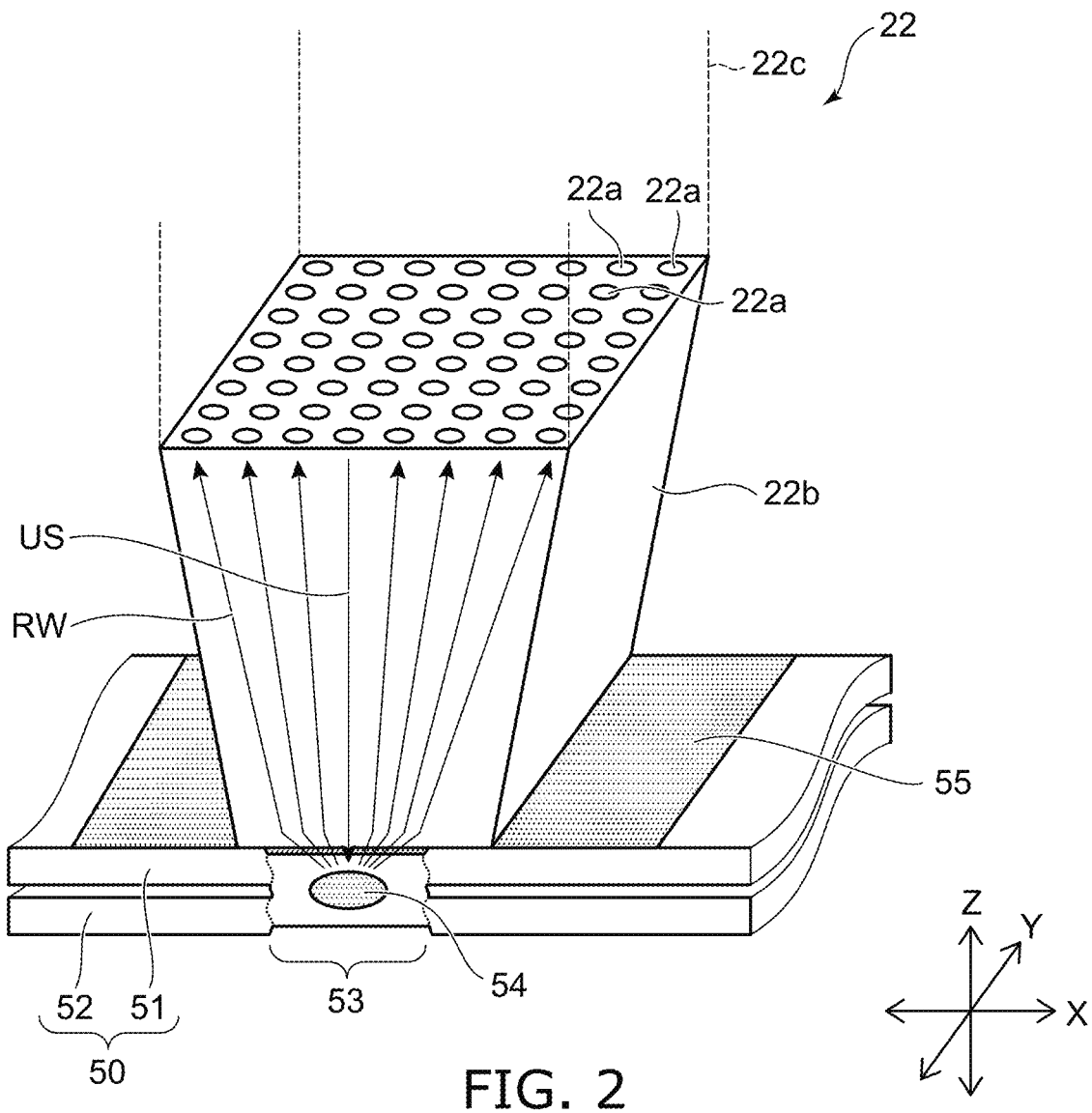
FIG. 2 is a schematic view showing the structure of the detector and the joined body.

FIG. 2 is a schematic view showing the structure of the detector and the joined body.

In the example of FIG. 2, the object of the probe by the detector 22 is the joined body 50. The joined body 50 includes a metal plate 51 (a first member) and a metal plate 52 (a second member). The metal plate 51 and the metal plate 52 are joined at a weld portion 53. In other words, a boundary between the metal plate 51 and the metal plate 52 does not exist at the weld portion 53. A solidified portion 54 that is formed by mixing the melted metal exists at the weld portion 53. The weld portion 53 is formed by resistance spot welding.

As shown in FIG. 2, the detector 22 includes detection elements 22a, a propagating part 22b, and a housing 22c.

The detection elements 22a are two-dimensionally arranged along an X-direction (a first direction) and a Y-direction (a second direction). The X-direction and the Y-direction cross each other. In the example, the Y-direction is perpendicular to the X-direction. For example, the detection element 22a is a transducer that emits an ultrasonic wave of a frequency of not less than 1 MHz and not more than 100 MHz. The detection element 22a transmits the ultrasonic wave along a Z-direction (a third direction). The Z-direction is perpendicular to the X-Y plane (a first plane).

The multiple detection elements 22a are located at the distal end of the housing 22c and are covered with the propagating part 22b. The propagating part 22b is positioned between the joined body 50 and the detection elements 22a when the detector 22 is caused to contact the joined body 50. When the detection element 22a emits an ultrasonic wave, the ultrasonic wave propagates through the propagating part 22b and is transmitted outside the detector 22. When the ultrasonic wave is reflected, the reflected wave propagates through the propagating part 22b and reaches the detection elements 22a.

The detection elements 22a detect the reflected wave. The intensity of the signal detected by the detection elements 22a corresponds to the intensity of the reflected wave. The detector 22 acquires signals (intensity data) indicating the reflected wave intensity and transmits the signals to the processing device 12.

The propagating part 22b includes a resin material or the like through which the ultrasonic wave easily propagates. Deformation, damage, and the like of the detection elements 22a can be suppressed by the propagating part 22b when the detector 22 contacts the weld portion 53. The propagating part 22b has a hardness sufficient to suppress the deformation, damage, and the like when contacting the weld portion 53.

A couplant liquid 55 is coated onto the surface of the joined body 50 so that the ultrasonic wave easily propagates between the detector 22 and the joined body 50 when probing. Each detection element 22a transmits an ultrasonic wave US toward the joined body 50 on which the couplant liquid 55 is coated.

For example, as shown in FIG. 2, one detection element 22a transmits the ultrasonic wave US toward the joined body 50. A portion of the ultrasonic wave US is reflected by the upper surface, lower surface, or the like of the joined body 50. The multiple detection elements 22a each detect a reflected wave RW. In the probe, each detection element 22a sequentially transmits the ultrasonic wave US; and each reflected wave RW is detected by the multiple detection elements 22a.

The processing device 12 uses the intensity data to perform various processing. For example, the processing device 12 inspects the weld portion 53. The processing device 12 may identify the position of the weld portion 53 in the joined body 50. The processing device 12 may calculate the center position of the weld portion 53. The processing device 12 may calculate the diameter of the weld portion 53.

Figure 3A:
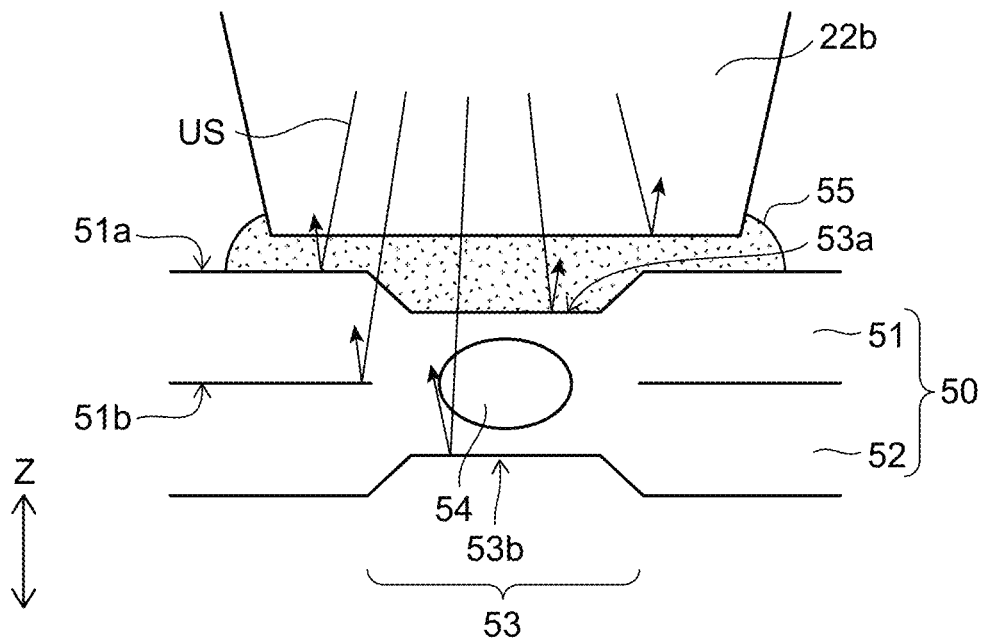
FIGS. 3A to 3C are schematic views for describing operations of the processing system according to the embodiment.
Figure 3B:
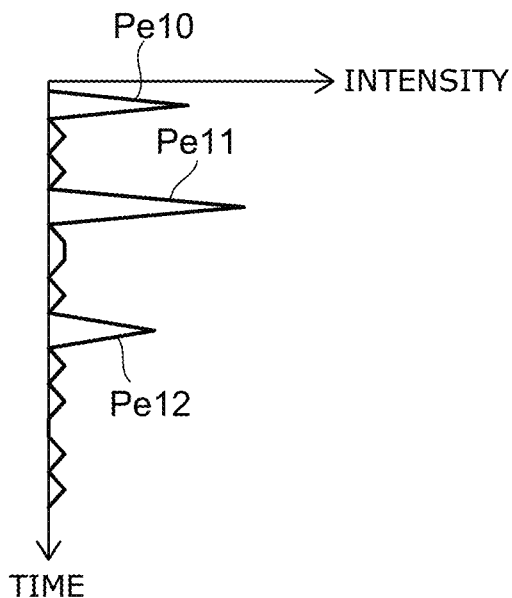
Figure 3C:
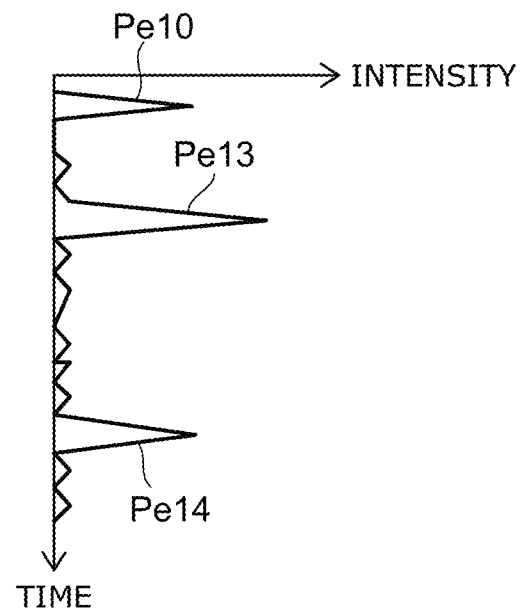

FIGS. 3A to 3C are schematic views for describing operations of the processing system according to the embodiment.

As shown in FIG. 3A, the ultrasonic wave US is reflected by the surface of the propagating part 22b, an upper surface 51a and a lower surface 51b of the metal plate 51, and an upper surface 53a and a lower surface 53b of the weld portion 53.

The Z-direction positions of the surface of the propagating part 22b, the upper surface 51a, the upper surface 53a, the lower surface 51b, and the lower surface 53b are different from each other. In other words, distances in the Z-direction between the detection element 22a and these surfaces are different from each other. The detection element 22a detects peaks of the reflected wave intensities when detecting the reflected waves from these surfaces. Which surface reflected the ultrasonic wave US can be discriminated by calculating the time until each peak is detected after transmitting the ultrasonic wave US.

FIGS. 3B and 3C are graphs illustrating the relationship between the time after transmitting the ultrasonic wave US and the intensity of the reflected wave RW at one point in the X-Y plane. In FIGS. 3B and 3C, the horizontal axis is the intensity of the detected reflected wave RW. The vertical axis is the elapsed time after transmitting the ultrasonic wave US. The time corresponds to the Z-direction position. The graph of FIG. 3B illustrates a detection result of the reflected waves RW from the surface of the propagating part 22b, the upper surface 51a, and the lower surface 51b. In other words, the graph of FIG. 3B illustrates the detection result of the reflected waves RW from a point that is not joined. The graph of FIG. 3C illustrates the detection result of the reflected waves RW from the surface of the propagating part 22b, the upper surface 53a, and the lower surface 53b. In other words, the graph of FIG. 3C illustrates the detection result of the reflected waves RW from a point that is joined.

In the graphs of FIGS. 3B and 3C, a peak Pe10 is based on the reflected wave RW from the surface of the propagating part 22b. A peak Pe11 is based on the reflected wave RW from the upper surface 51a. A peak Pe12 is based on the reflected wave RW from the lower surface 51b. Times from the transmission of the ultrasonic wave US until the peak Pe11 and the peak Pe12 are detected correspond respectively to the Z-direction positions of the upper surface 51a and the lower surface 51b.

Similarly, a peak Pe13 is based on the reflected wave RW from the upper surface 53a. A peak Pe14 is based on the reflected wave RW from the lower surface 53b. The times from the transmission of the ultrasonic wave US until the peak Pe13 and the peak Pe14 are detected correspond respectively to the Z-direction positions of the upper surface 53a and the lower surface 53b.

The processing device 12 determines whether or not the peak Pe12 exists in the Z-direction reflected wave intensity distribution at points in the X-Y plane. Specifically, the processing device 12 detects a peak in a range in the Z-direction in which the peak Pe12 may be detected. The processing device 12 compares the peak intensity to a threshold. The threshold and the range in the Z-direction are preset.

When the peak intensity is greater than the threshold, the processing device 12 determines that the peak is the peak Pe12. The existence of the peak Pe12 indicates that the lower surface 51b exists at the point and that the metal plate 51 and the metal plate 52 are not joined. The processing device 12 determines that points at which the peak Pe12 is detected are not joined. The processing device 12 determines that points at which the peak Pe12 is not detected are joined. The processing device 12 sequentially determines whether or not each of multiple points in the X-Y plane are joined. The processing device 12 identifies a cluster of points determined to be joined as the weld portion 53.

For example, in the inspection processing, the processing device 12 identifies the weld portion 53 and calculates the diameter of the weld portion 53. The processing device 12 compares the diameter to a preset threshold. The processing device 12 determines the weld portion 53 to pass when the diameter is greater than the threshold. The processing device 12 determines the weld portion 53 to fail when the diameter is not more than the threshold. The diameter that is compared to the threshold is the major diameter or the minor diameter of the weld portion 53.

In the examples of FIGS. 3B and 3C, the intensity of the reflected wave RW is expressed as an absolute value. The intensity of the reflected wave may be expressed in any form. For example, the reflected wave intensity that is output from the detection element 22a includes positive values and negative values according to the phase. Various processing may be performed based on the reflected wave intensity including positive values and negative values. The reflected wave intensity that includes positive values and negative values may be converted into absolute values. The average value of the reflected wave intensities may be subtracted from the reflected wave intensity at each time. Or, the weighted average value, the weighted moving average value, etc., of the reflected wave intensities may be subtracted from the reflected wave intensity at each time. Filtering may be performed to extract only a frequency component of a specific period. The various processing described in the application can be performed even when the results of such processing applied to the reflected wave intensity are used.

Figure 4:
FIG. 4 is a schematic view illustrating intensity data obtained by the probe.
Figure 4:
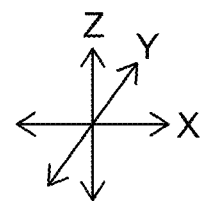

FIG. 4 is a schematic view illustrating intensity data obtained by the probe.

In the probe as described above, each detection element 22a sequentially transmits an ultrasonic wave; and each reflected wave is detected by the multiple detection elements 22a. In the specific example shown in FIG. 2, 8×8, i.e., sixty-four detection elements 22a are provided. In such a case, the sixty-four detection elements 22a sequentially transmit ultrasonic waves. One detection element 22a repeatedly detects the reflected wave 64 times. The detection result of the Z-direction reflected wave intensity distribution is output 64 times from one detection element 22a. The intensity distribution of the sixty-four reflected waves output from the one detection element 22a are summed. The summed intensity distribution is used as the intensity distribution at the coordinate at which the one detection element 22a is located in one probe. Similar processing is performed for the detection results of the sixty-four detection elements 22a. Aperture synthesis may be performed to increase the resolution in the X-direction and the Y-direction of the detection results of the detection elements 22a. The reflected wave intensity distribution in the Z-direction is generated at each of multiple points in the X-Y plane (the first plane) by the processing described above. In other words, three-dimensional intensity data that includes the reflected wave intensity at points in the X-direction, the Y-direction, and the Z-direction is obtained.

FIG. 4 schematically shows a three-dimensional intensity distribution. The schematic view of FIG. 4 shows the weld portion 53 vicinity of the three-dimensional intensity data. In FIG. 4, portions at which the luminance is high are portions at which the reflected wave intensity of the ultrasonic wave is relatively large. In the example of FIG. 4, reflected waves from the upper surface and the lower surface of the weld portion 53 and reflected waves of multiple reflections between the upper surface and the lower surface appear.

When obtaining data related to the weld portion in the inspection processing, the control device 10 operates the manipulator 21 so that the distal end of the detector 22 contacts the weld portion 53. When performing the probe, the detector 22 is set to a prescribed position and a prescribed orientation. For example, the distal end of the detector 22 is set to the prescribed position and the prescribed orientation. The position and orientation of another portion corresponding to the position and orientation of the detector 22 may be set to the prescribed position and the prescribed orientation. In such a case as well, the detector 22 can be considered to be set to the prescribed position and the prescribed orientation. For example, the prescribed position and the prescribed orientation are preset as a teaching point.

The control device 10 operates the manipulator 21 according to an operation program to set the detector 22 to the prescribed position and the prescribed orientation. Specifically, the control device 10 acquires data of the rotation angles of the actuators from encoders included at the joints of the manipulator 21. The control device 10 generates a control signal based on the stored prescribed position and prescribed orientation and the acquired data. The control device 10 transmits the generated control signal to the robot 20 and moves the manipulator 21 by operating the actuators.

Figure 5:
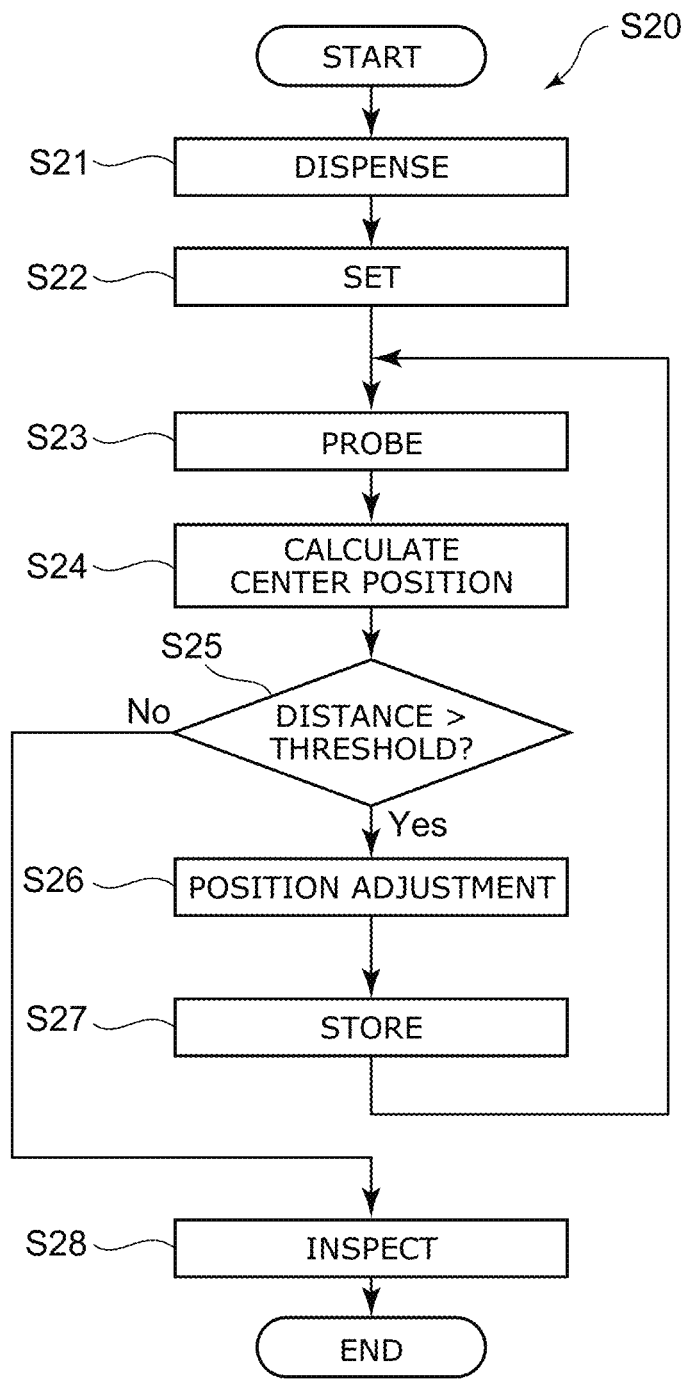
FIG. 5 is a flowchart showing the inspection processing according to the robot system of the embodiment.

FIG. 5 is a flowchart showing the inspection processing according to the robot system of the embodiment.

In the inspection processing (step S20), the control device 10 dispenses the couplant liquid 55 from the dispenser 25 toward the joined body 50 (step S21). The control device 10 sets the detector 22 to the prescribed position and the prescribed orientation (step S22). The detector 22 contacts the joined body 50. The control device 10 causes the detector 22 to perform the probe of the weld portion 53 (step S23). The detector 22 transmits the intensity data obtained by the probe to the processing device 12. The processing device 12 uses the intensity data to calculate the center position in the X-Y plane of the weld portion 53 (step S24).

The processing device 12 compares the distance in the X-Y plane of the weld portion 53 between the center position and the position in the X-Y plane of the detector 22 with a preset threshold (step S25). The range of the probe in the X-Y plane corresponds to the position in the X-Y plane of the detector 22. For example, the position in the X-Y plane of the detector 22 corresponds to the center position in the X-Y plane of the intensity data. The processing device 12 can calculate the distance between the center in the X-Y plane of the weld portion 53 and the center in the X-Y plane of the intensity data as the distance between the center in the X-Y plane of the weld portion 53 and the position in the X-Y plane of the detector 22. The control device 10 performs a position adjustment when the distance is greater than the threshold (step S26). In the position adjustment, the control device 10 moves the detector 22 along the X-Y plane to reduce the distance. The control device 10 stores the movement distance of the detector 22 of the position adjustment (step S27). Step S23 is performed again after step S27.

The control device 10 may move the detector 22 away from the joined body 50 before moving the detector 22 along the X-Y plane, and may approach the detector 22 toward the joined body 50 after moving the detector 22 along the X-Y plane. The friction between the detector 22 and the joined body 50 can be avoided thereby.

When the distance is not more than the threshold in step S25, the processing device 12 inspects the weld portion 53 by using the intensity data obtained by the directly-previous probe (step S28). For example, the processing device 12 compares the diameter of the weld portion 53 to a preset threshold.

The method for calculating the center position of the weld portion 53 in the inspection processing described above will now be described. The center position can be calculated using any of the following methods.

Figure 6A:
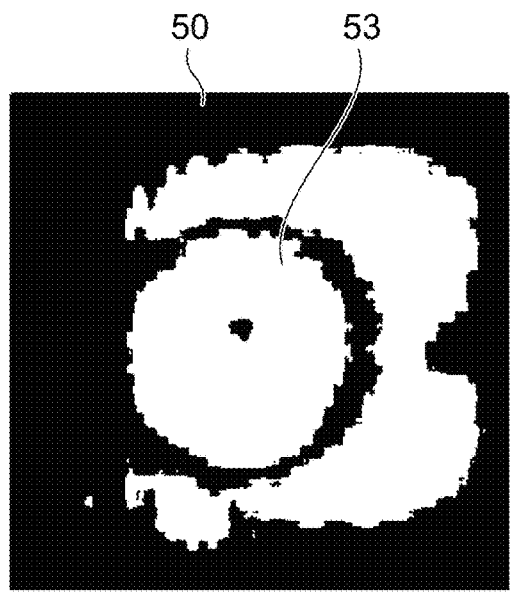
FIGS. 6A to 6C are schematic views showing a reflected wave intensity distribution obtained by processing the intensity data.
Figure 6B:
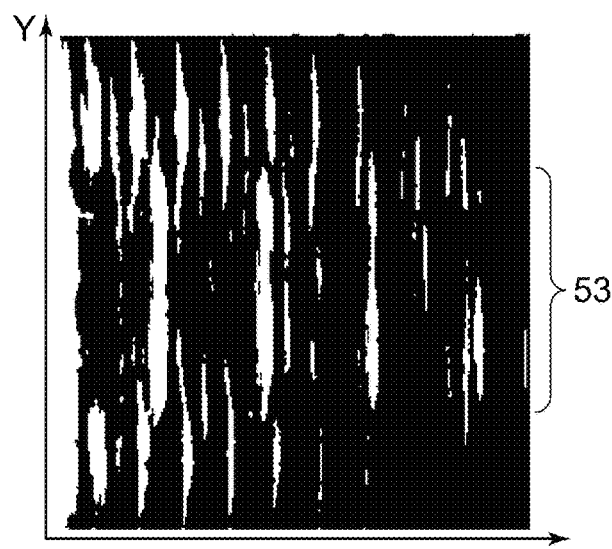
Figure 6C:
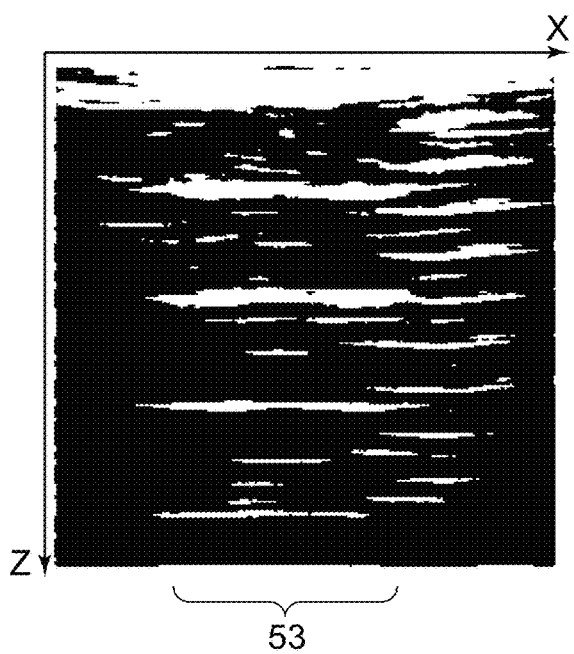

FIGS. 6A to 6C are schematic views showing a reflected wave intensity distribution obtained by processing the intensity data.

The processing device 12 acquires the data shown in FIGS. 6A to 6C by processing the intensity data. FIG. 6A shows the reflected wave intensity distribution in the X-Y plane at the weld portion 53 vicinity. FIG. 6B shows the reflected wave intensity distribution in the Y-Z plane at the weld portion 53 vicinity. FIG. 6C shows the reflected wave intensity distribution in the X-Z plane at the weld portion 53 vicinity.

The data of FIG. 6A is obtained by summing the intensity in the Z-direction at each point in the X-Y plane. The data of FIG. 6B is obtained by summing the intensity in the X-direction at each point in the Z-direction. The data of FIG. 6C is obtained by summing the intensity in the Y-direction at each point in the Z-direction. FIGS. 6A to 6C show the schematically binarized intensities of the reflected waves. The white points indicate that the intensity of the reflected wave is relatively high at those points. The black points indicate that the intensity of the reflected wave is relatively low at those points.

For example, the processing device 12 calculates the centroid position of the intensity as the center position of the weld portion 53 for the reflected wave intensity distribution in the X-Y plane shown in FIG. 6A. For example, as shown in FIG. 6A, the luminous centroid position of the binarized image may be calculated. Or, the luminous centroid position may be calculated for an image in which each pixel has a pixel value of one of three or more levels (e.g., 0 to 255).

Or, the processing device 12 may calculate the centroid position by extracting the reflected wave component from the weld portion 53 in the Z-direction. For example, as shown in FIGS. 6B and 6C, the period at which the reflected wave from the weld portion 53 is detected is different from the period at which the reflected waves from other portions are detected. The processing device 12 filters the intensity distribution in the Z-direction by using a preset thickness of the weld portion 53. Thereby, the processing device 12 extracts the reflected wave component from the weld portion 53. The processing device 12 calculates the centroid position of the intensity distribution in the X-Y plane after filtering as the center position of the weld portion 53.

Or, the processing device 12 may identify the weld portion 53 and calculate the center position based on the identified weld portion 53.

Figure 7:
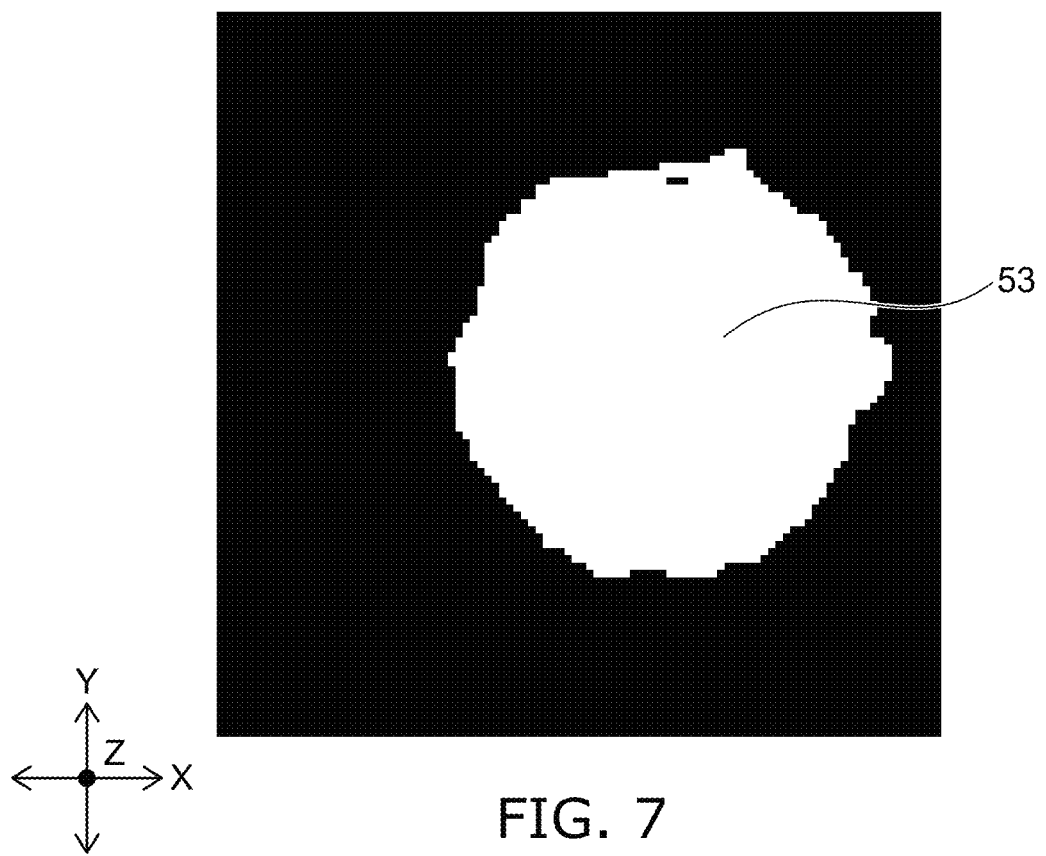
FIG. 7 is a schematic view illustrating an example of the identified weld portion.

FIG. 7 is a schematic view illustrating an example of the identified weld portion.

FIG. 7 shows the result of determining a joint or non-joint at each of multiple points in the X-Y plane in which the probe is performed. The ranges in the X-direction and the Y-direction of the region in which the determination of the joint or non-joint is performed correspond to the range in the X-direction and the Y-direction in which the intensity data is obtained. As an example, the range in the X-direction and the range in the Y-direction of the two-dimensional data shown in FIG. 7 correspond respectively to the range in the X-direction and the range in the Y-direction of the three-dimensional intensity data shown in FIG. 4. A portion of the range in the X-direction and the Y-direction in which the intensity data is obtained may be extracted, and the determination of the joint or non-joint may be performed for the extracted region. In FIG. 7, the points that are determined to be joined based on the intensity data are illustrated using white. The points that are determined not to be joined are illustrated using black. A cluster of points determined to be joined is identified as the weld portion 53. The processing device 12 uses the determination result of the joining at the points to generate the two-dimensional data shown in FIG. 7.

The processing device 12 may calculate the centroid position in the X-Y plane of the identified weld portion 53 as the center position of the weld portion 53. As described above, the weld portion 53 can be identified by determining the joint or non-joint at each point in the X-Y plane. The processing device may calculate the center of a circle that inscribes or circumscribes the identified weld portion 53 in the X-Y plane as the center position of the weld portion 53.

When the inspection processing shown in FIG. 5 is performed for the multiple joined bodies 50, multiple movement distances of position adjustments are stored. When a set number or more of the multiple movement distances are stored, the control device 10 uses the multiple movement distances to correct the prescribed position.

Figure 8:
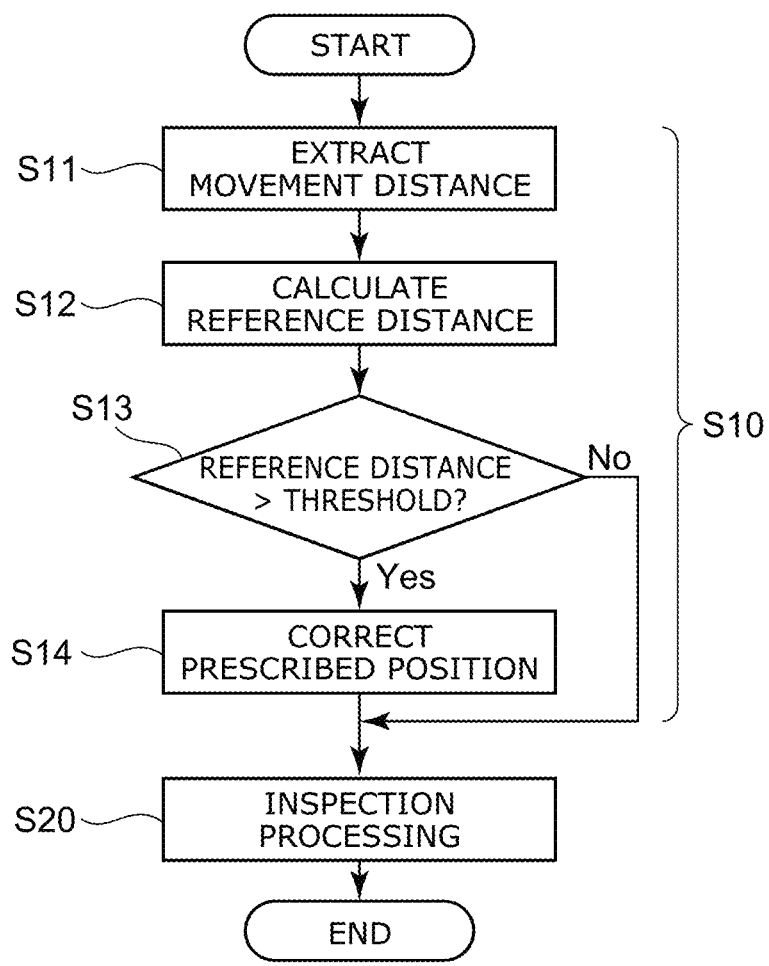
FIG. 8 is a flowchart showing correction processing according to the robot system according to the embodiment.

FIG. 8 is a flowchart showing correction processing according to the robot system according to the embodiment.

In the correction processing (step S10), the control device 10 extracts n movement distances from all of the stored previous movement distances (step S11). n may be the number of all previous movement distances. n may be preset. For example, the n movement distances are extracted in order from the most recent time of performing the position adjustment. The control device 10 uses the extracted multiple movement distances to calculate a reference distance (step S12). The reference distance is a value for determining the trend of the movement distance of the position adjustment. The control device 10 compares the calculated reference distance to a preset threshold (a first threshold) (step S13). When the reference distance is greater than the threshold, the control device 10 uses at least a portion of the multiple movement distances to correct the prescribed position (step S14).

For example, based on the extracted multiple movement distances, the control device 10 calculates the average value of the movement distances in the X-direction and the average value of the movement distances in the Y-direction. The control device 10 shifts the prescribed X-direction position by the amount of the calculated average value in the X-direction. The control device 10 shifts the prescribed Y-direction position by the amount of the calculated average value in the Y-direction. The control device 10 may calculate a predicted value from the multiple movement distances and shift the prescribed position by the amount of the predicted value. The control device 10 may shift the prescribed position by using an average value or a predicted value obtained from a portion of the multiple movement distances. The inspection processing shown in FIG. 5 is performed when the reference distance is not more than the threshold or after correcting the prescribed position.

The average value of the extracted multiple movement distances is used as the reference distance. The reference distance may be a predicted value based on the multiple movement distances. The predicted value is obtained using an approximation formula, a Kalman filter, or a model (artificial intelligence).

For example, the control device 10 generates an approximation formula of the relationship between the execution count of the inspection processing and the multiple movement distances. The control device 10 uses the approximation formula to calculate the predicted value of the movement distance of the next inspection processing. When a Kalman filter is used, the control device 10 generates a linear model of the relationship between the execution count of the inspection processing and the multiple movement distances based on previously obtained data.

When a new movement distance for a new inspection processing is obtained, the control device 10 calculates the next reference distance by using the actual movement distance and the reference distance (the predicted value) for the inspection processing. When a model is used, the model is trained to output the reference distance according to the input of multiple previous movement distances. It is favorable for the model to include a neural network. The control device 10 inputs a specified number of previous movement distances to the model, and acquires the reference distance output from the model.

Figure 9A:
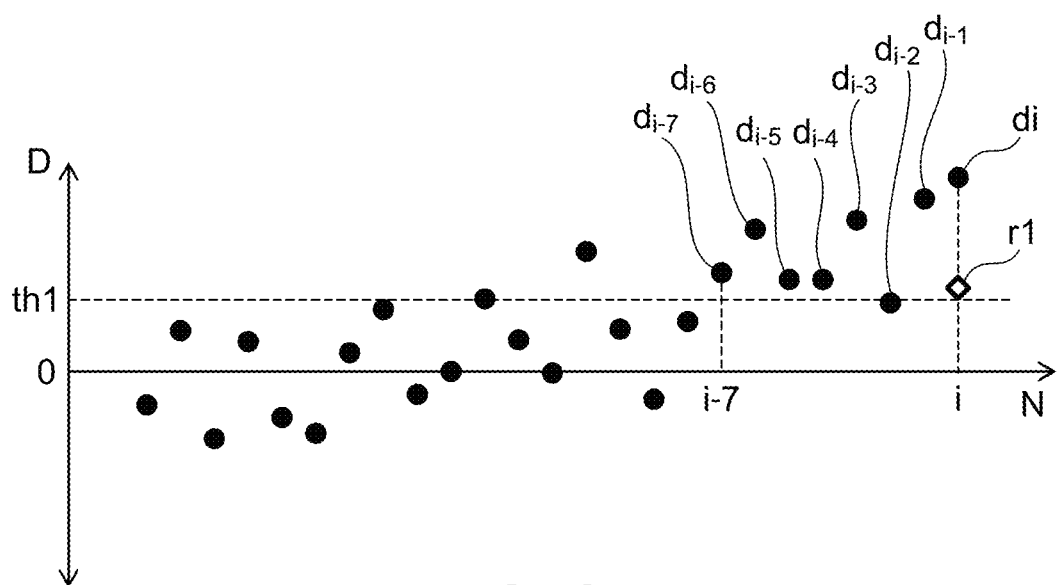
FIGS. 9A and 9B are schematic views showing movement distances and reference distances.
Figure 9B:
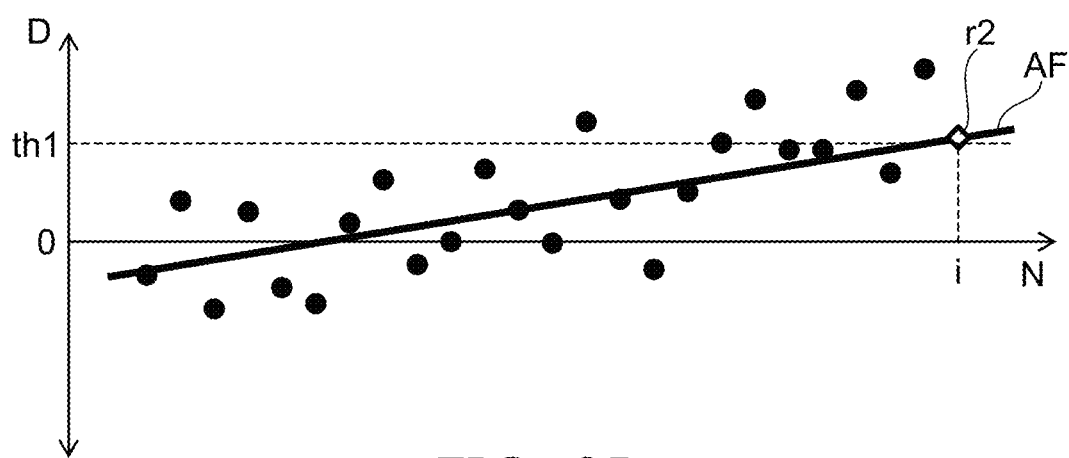

FIGS. 9A and 9B are schematic views showing movement distances and reference distances.

In FIGS. 9A and 9B, the horizontal axis is an execution count N of the position adjustment. The time of execution is more recent toward the right. The vertical axis is a movement distance D in the X-direction. The points at which the movement distance is zero indicate that a position adjustment was not performed. The round plots show the movement distances of the position adjustments. The diamond plots show the reference distances.

In the example shown in FIG. 9A, a reference distance r1 is calculated by averaging the eight movement distances $d_i$ to $d_{i-7}$, i.e., the newest ith to the (i-7)th. The reference distance r1 is greater than a threshold th1. Therefore, the control device 10 uses at least a portion of the movement distances $d_i$ to $d_{i-7}$ to correct the prescribed X-direction position.

In the example shown in FIG. 9B, an approximation formula AF between the execution count N and the movement distance D is generated. In the example, the approximation formula AF is linear. The approximation formula AF may be nonlinear. The control device 10 uses the approximation formula AF to calculate the movement distance $d_i$ of the ith position adjustment as a reference distance r2. The reference distance r2 is greater than the preset threshold th1. Therefore, the control device 10 corrects the prescribed X-direction position by using the reference distance r2 predicted from the multiple movement distances or at least a portion of the multiple movement distances.

Advantages of the embodiment will now be described. When inspecting the weld portion 53 by using the reflected wave intensity data, it is favorable for the position in the X-Y plane of the detector 22 to be proximate to the center position in the X-Y plane of the weld portion 53. The entire weld portion 53 is more easily included in the range of the probe as the detector 22 is more proximate to the center of the weld portion 53. The inspection accuracy of the weld portion 53 can be increased thereby. To cause the detector 22 to approach the center of the weld portion 53, a method may be considered in which the position adjustment is performed each time the probe is performed. However, although the inspection accuracy can be increased according to this method, the time necessary for the inspection processing lengthens.

For example, the prescribed position of the detector 22 is set to match the design position of the weld portion 53. The design position is the predesigned position at which the weld portion 53 is formed. However, there are cases where the weld portion 53 deviates from the design position due to wear of the electrode of the welding device, replacement of the electrode, misalignment of the member with respect to the welding device, etc. According to the embodiment, the processing system 1 calculates the reference distance by using movement distances of the detector 22 of the multiple previous position adjustments. Then, when the reference distance is greater than a preset threshold, the processing system 1 corrects the prescribed position by using at least a portion of the multiple movement distances. The distance between the center of the weld portion 53 and the detector 22 set to the prescribed position in the next inspection processing can be reduced thereby. In other words, the position adjustment can be omitted from the next inspection processing. According to the embodiment, the inspection accuracy can be increased while suppressing the time necessary for the inspection processing.

By using the multiple movement distances to calculate the reference distance, the trend of the change of the position of the weld portion 53 can be reflected in the prescribed position. For example, even when the fluctuation of the movement distance is large, the effects of the fluctuation on the reference distance can be reduced. The likelihood of uselessly correcting the prescribed position or excessively correcting the prescribed position due to the fluctuation can be reduced, and the prescribed position can be more appropriately corrected.

When calculating the reference distance, it is favorable to exclude outliers from the extracted multiple movement distances. When the reference distance is calculated using outliers, there is a possibility that the reference distance may excessively increase. There is a possibility that the prescribed position may be uselessly corrected thereby, or the prescribed position may be excessively corrected. By calculating the reference distance by excluding outliers, the prescribed position can be more appropriately corrected.

Outliers can be determined using a test statistic. A test statistic can be calculated based on the Grubbs test. In the Grubbs test, a movement distance r, an average value x, and a variance 6 are used to calculate the test statistic G, i.e., $G=(r-x)/\sigma$. The average value x and the variance 6 are calculated from the multiple movement distances. The control device 10 calculates the test statistic G. The control device 10 determines that the movement distance r is an outlier when the test statistic G is greater than 2.745. Other than the Grubbs test, Thompson's rejection test may be used to determine outliers.

When multiple weld portions 53 are formed in one joined body 50, the prescribed position and the prescribed orientation are set for each weld portion 53. Specifically, when performing correction processing of one of the multiple weld portions 53, the control device 10 refers to the result of the position adjustment for the one of the multiple weld portions 53 in another joined body 50 that was previously performed. The processing system 1 performs the correction processing described above by using the results of multiple position adjustments.

Figure 10:
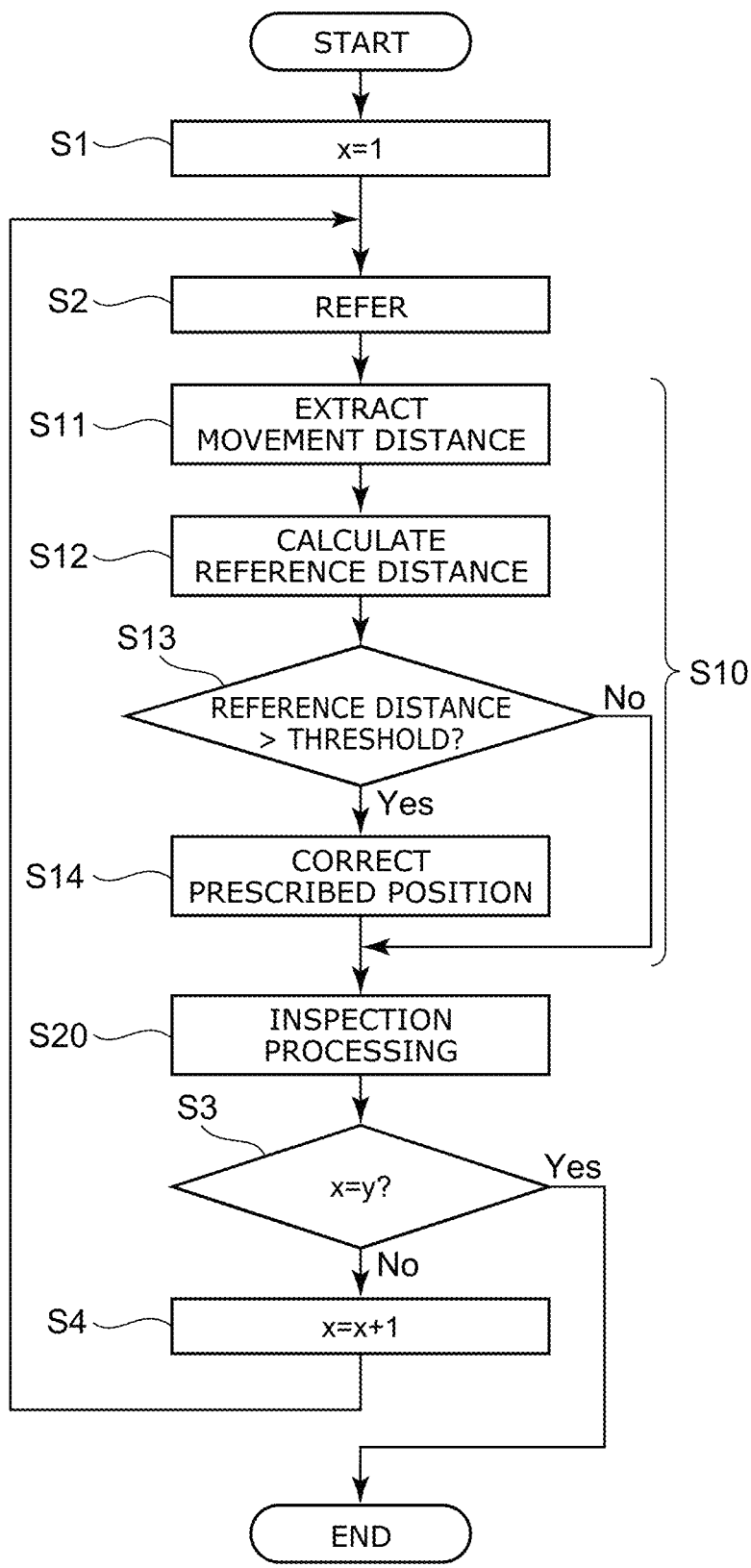
FIG. 10 is a flowchart showing processing according to the robot system according to the embodiment.

FIG. 10 is a flowchart showing processing according to the robot system according to the embodiment.

For example, y weld portions 53 are formed in one joined body 50. The control device 10 refers to the results of previous position adjustments related to the xth weld portion 53 (step S2). The initial value of x is set to 1 (step S1). The control device 10 extracts multiple movement amounts from the referenced results (step S11). Thereafter, steps S12 to S14 are performed similarly to the correction processing described above. The inspection processing (step S20) is performed after the correction processing.

After the inspection processing, the control device 10 determines whether or not x is equal to y (step S3). In other words, it is determined whether or not the correction processing and the inspection processing have been performed for all of the y weld portions 53. When x is less than y, the control device 10 adds 1 to x (step S4). Subsequently, step S2 is re-performed.

Correction processing of the y weld portions 53 may be performed before the inspection processing of one of the y weld portions 53. For example, the correction processing of the y weld portions 53 may be performed while transferring the joined body 50 of the inspection object to the location of the robot 20. The time necessary for the calculation processing of the robot 20 after the joined body 50 is transferred can be reduced thereby.

First Modification

Figure 11:
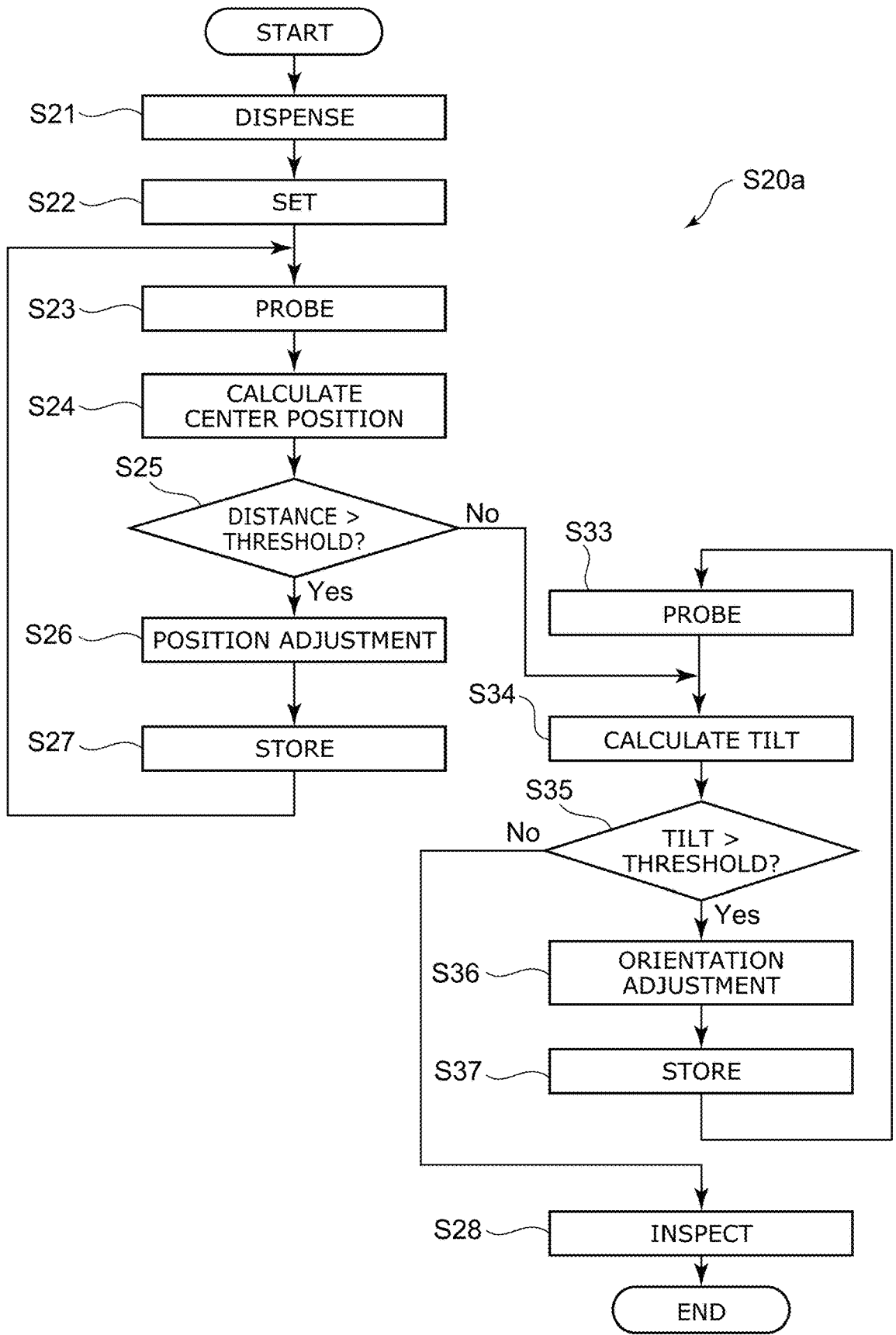
FIG. 11 is a flowchart showing inspection processing according to the robot system according to the first modification of the embodiment.

FIG. 11 is a flowchart showing inspection processing according to the robot system according to the first modification of the embodiment.

Compared to the inspection processing shown in FIG. 5, the inspection processing (step S20a) shown in FIG. 11 further includes steps S33 to S37. When the distance is determined not to be more than the threshold in step S25, the processing device 12 calculates the tilt of the detector 22 for the weld portion 53 (step S34). The processing device 12 compares the tilt to a preset threshold (step S35). When the tilt is greater than the threshold, the control device 10 performs an orientation adjustment (step S36). In the orientation adjustment, the control device 10 rotates the detector 22 to reduce the tilt. The rotation center is set to the distal end of the detector 22. The control device 10 stores the rotation angle of the detector 22 of the orientation adjustment (step S37). After step S37, the control device 10 performs the probe of the detector 22 (step S33). Subsequently, step S34 is re-performed. When the tilt is not more than the threshold, the processing device 12 inspects the weld portion 53 by using the intensity data obtained by the directly-previous probe (step S28).

In the inspection processing described above, steps S33 to S37 may be performed before steps S23 to S27. Steps S24 to S27 and steps S34 to 37 may be performed in parallel based on the result of one probe.

Figure 12:
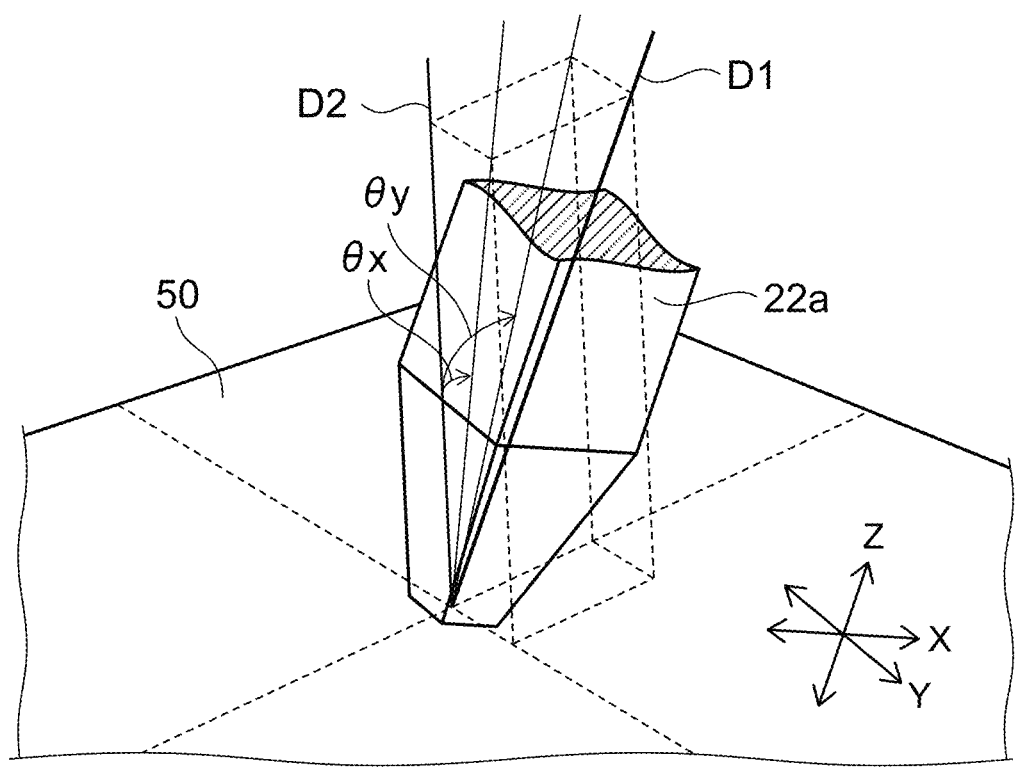
FIG. 12 is a schematic view showing the detector.

FIG. 12 is a schematic view showing the detector. For example, the orientation corresponds to a direction D1 of the detector 22 shown in FIG. 12. The direction D1 is perpendicular to the arrangement directions of the multiple detection elements 22a. The tilt is represented by an angle $\theta x$ around the X-direction and an angle $\theta y$ around the Y-direction between the direction D1 of the detector 22 and a normal direction D2 of the weld portion 53.

The angle that represents the orientation shown in FIG. 12 may be different from an angle in the robot coordinate system used to express the teaching point. When setting the teaching point, the control device 10 may convert the angle representing the orientation of the detector 22 into an angle in the robot coordinate system as appropriate.

Figure 13A:
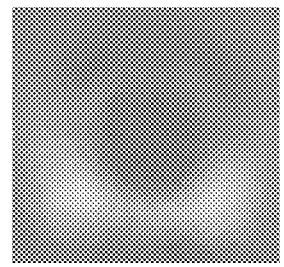
FIGS. 13A to 13C are examples of images obtained in the inspection.
Figures 13B, 13C:
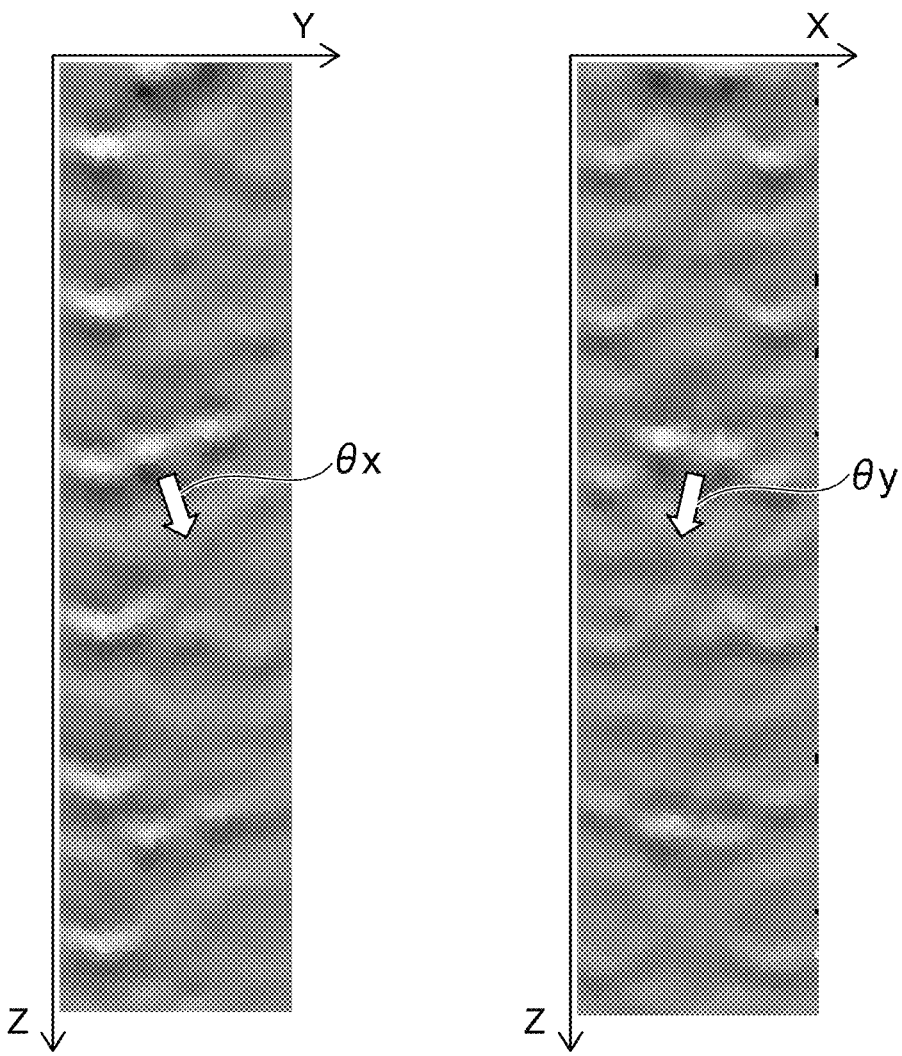

FIGS. 13A to 13C are examples of images obtained in the inspection.

A method for calculating the tilt will now be described. FIG. 13A is an image of the reflected wave intensity distribution in the X-Y plane at the weld portion 53 vicinity. FIG. 13B is an image of the reflected wave intensity distribution in the Y-Z plane at the weld portion 53 vicinity. FIG. 13C is an image of the reflected wave intensity distribution in the X-Z plane at the weld portion 53 vicinity. In the images of FIGS. 13A to 13C, the luminance corresponds to the intensity of the reflected wave. In other words, a brighter pixel color indicates that the reflected wave intensity is high at that point.

As shown in FIG. 13B, the angle $\theta x$ is calculated based on the detection result in the Y-Z plane. As shown in FIG. 13C, the angle $\theta y$ is calculated based on the detection result in the X-Z plane. Specifically, the processing device 12 calculates the average of the three-dimensional luminance gradients. The processing device 12 uses the average of the gradients around the X-direction as the angle $\theta x$. The processing device 12 uses the average of the gradients around the Y-direction as the angle $\theta y$.

Figure 14:
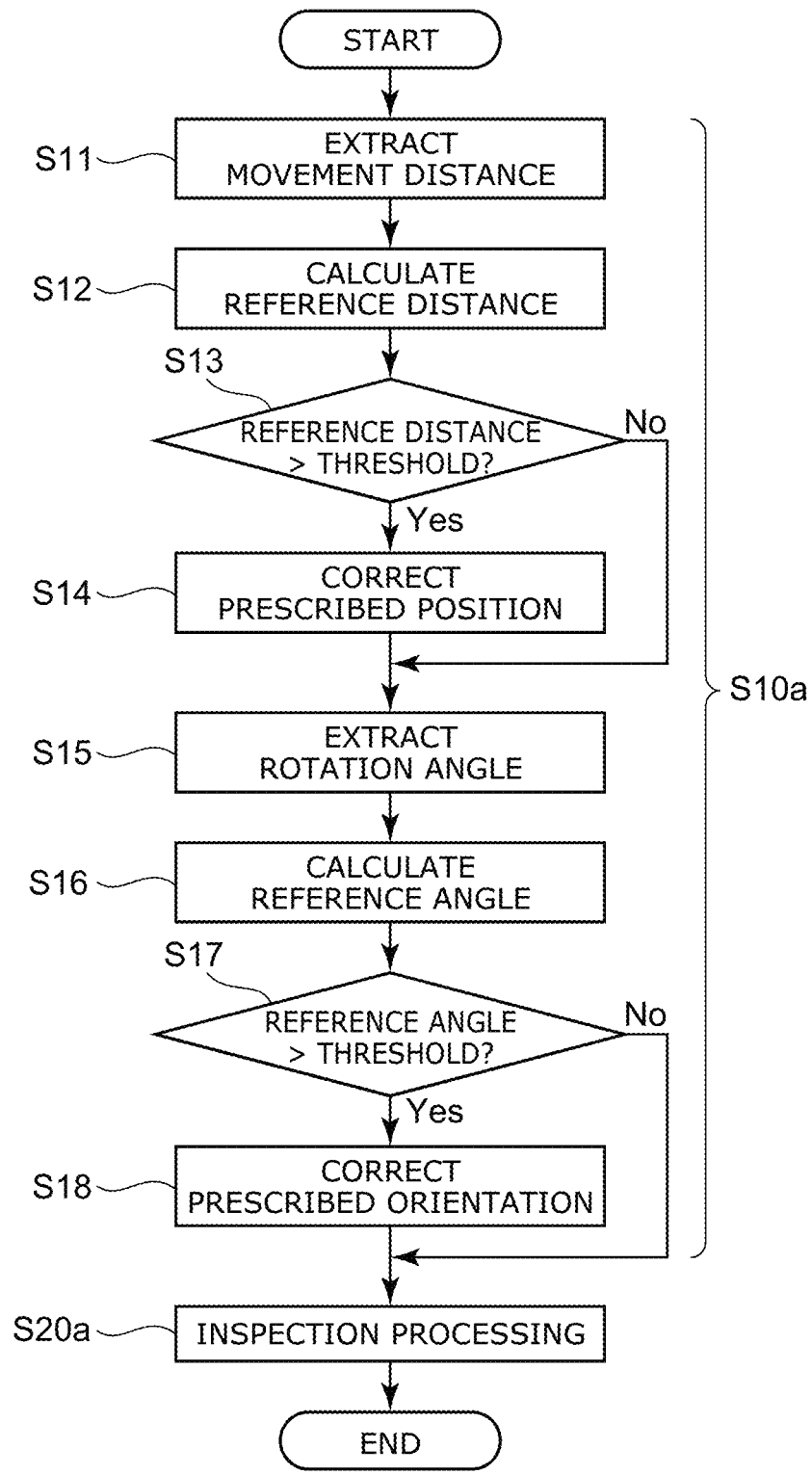
FIG. 14 is a flowchart showing processing according to the robot system according to the first modification of the embodiment.

FIG. 14 is a flowchart showing processing according to the robot system according to the first modification of the embodiment.

Compared to the correction processing shown in FIG. 8, the correction processing (step S10a) shown in FIG. 14 further includes steps S15 to S18.

The control device 10 extracts m rotation angles from all of the stored previous rotation angles (step S15). m may be the number of all previous movement distances. m may be preset. m may be equal to the number n of the extracted movement distances. For example, the m rotation angles are extracted in order from the most recent time of performing the orientation adjustment. The control device 10 uses the extracted multiple rotation angles to calculate the reference angle (step S16). The reference angle is a value for determining the trend of the rotation angle of the orientation adjustment. For example, the reference angle is the average value of the multiple rotation angles. The reference angle may be a predicted value based on the multiple rotation angles. The predicted value is obtained using an approximation formula, a Kalman filter, or a model (artificial intelligence) of the relationship between the execution count of the inspection processing and the multiple rotation angles.

The control device 10 compares the calculated reference angle to a preset threshold (a second threshold) (step S17). When the reference angle is greater than the threshold, the control device 10 corrects the prescribed orientation by using at least a portion of the multiple rotation angles (step S18).

For example, the control device 10 calculates the average value of the rotation angles around the X-direction and the average value of the rotation angles around the Y-direction based on the extracted multiple rotation angles. The control device 10 rotates the prescribed orientation around the X-direction by the amount of the calculated average value around the X-direction. The control device 10 rotates the prescribed orientation around the Y-direction by the amount of the calculated average value around the Y-direction. The control device 10 may calculate the predicted value from the multiple rotation angles and rotate the prescribed orientation by the amount of the predicted value. The control device 10 may rotate the prescribed orientation by using an average value or a predicted value obtained from a portion of the multiple rotation angles.

The inspection processing shown in FIG. 11 is performed when the reference angle is not more than the threshold or after correcting the prescribed orientation.

To further increase the inspection accuracy, it is favorable for the tilt of the detector 22 with respect to the weld portion 53 to be small. The reflected wave from the weld portion 53 is detected more easily by the detector 22 as the tilt decreases. The inspection accuracy can be increased thereby. To reduce the tilt, a method may be considered in which the orientation adjustment is performed each time the probe is performed.

However, according to this method, the time necessary for the inspection processing lengthens.

According to the first modification, the processing system 1 calculates the reference angle by using the rotation angles of the detector 22 of multiple previous orientation adjustments. When the reference angle is greater than the preset threshold, the processing system 1 corrects the prescribed orientation by using at least a portion of the multiple rotation angles. By using the multiple rotation angles, the trend of the change of the tilt of the weld portion 53 can be reflected in the prescribed orientation. Thereby, the effect of reducing the tilt of the prescribed orientation with respect to the weld portion 53 can be expected for the next inspection processing. In other words, the likelihood of an orientation adjustment being necessary in the next inspection processing can be reduced. According to the first modification, the inspection accuracy can be further increased while suppressing the time necessary for the inspection processing.

By using the multiple rotation angles to calculate the reference angle, the trend of the change of the tilt of the detector 22 can be reflected in the prescribed orientation. For example, even when the fluctuation of the rotation angle is large, the effects of the fluctuation on the reference angle can be reduced. Likelihood of uselessly correcting the prescribed orientation or excessively correcting the prescribed orientation due to the fluctuation can be reduced, and the prescribed orientation can be more appropriately corrected.

When calculating the reference angle, it is favorable to exclude outliers from the extracted multiple rotation angles. When the reference angle is calculated using outliers, there is a possibility that the reference angle may be excessively large. There is a possibility that the prescribed orientation may be uselessly corrected thereby, or the prescribed orientation may be excessively corrected. By calculating the reference angle after excluding outliers, the prescribed orientation can be more appropriately corrected. As described above, outliers can be determined using a test statistic.

Second Modification

Figure 15:
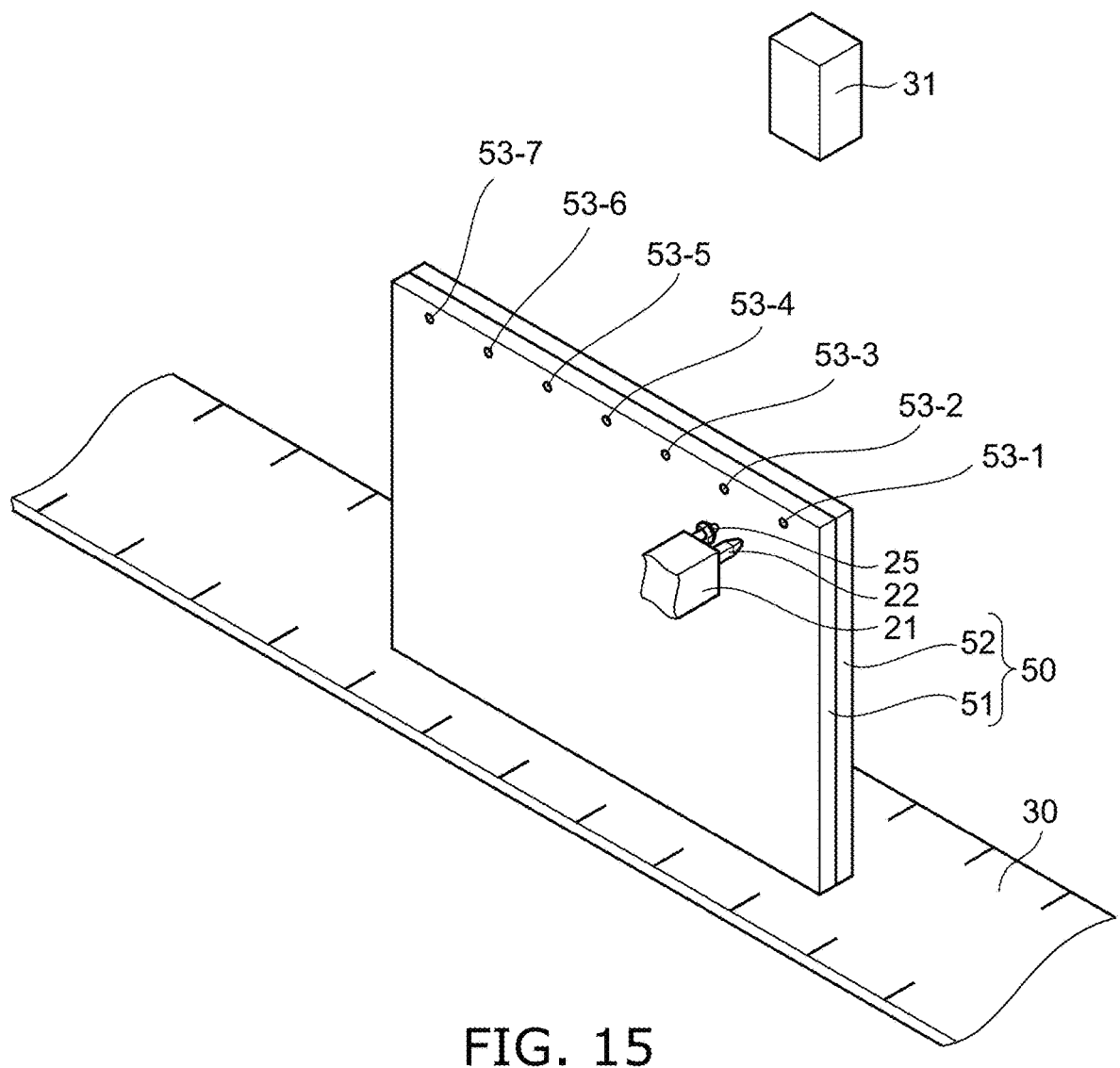
FIG. 15 is a schematic view showing a joined body that is transferred.

FIG. 15 is a schematic view showing a joined body that is transferred.

For example, as shown in FIG. 15, a transfer device 30 transfers the joined body 50 to the location at which the robot 20 is installed. The joined body 50 includes multiple weld portions 53-1 to 53-7. The robot system 2 sequentially inspects the multiple weld portions 53-1 to 53-7.

The position at which the joined body 50 is stopped is preset. When the transfer device 30 stops, the robot system 2 performs the inspection of the joined body 50. It is favorable for the positioning accuracy of the transfer device 30 to be sufficiently high so that the detector 22 contacts the weld portion 53 when set to the prescribed position and the prescribed orientation. When the positioning accuracy of the transfer device 30 is insufficiently high, the robot system 2 may be configured to determine whether or not misalignment of the joined body 50 exists.

As an example, in the inspection processing of two or more of the multiple weld portions 53-1 to 53-7, the detector 22 is moved in a similar direction when the position adjustment is performed. In such a case, the control device 10 determines that misalignment of the joined body 50 occurred in this direction. The control device 10 may shift the prescribed position of the detector 22 for the weld portion 53 by the amount of the misalignment amount in the direction of the misalignment for the remaining inspection processing of the multiple weld portions 53-1 to 53-7. The shift of the misalignment amount is performed for only the joined body 50 for which the misalignment was detected.

For example, the control device 10 refers to the results of the position adjustments of the two or more of the multiple weld portions 53-1 to 53-7. The control device 10 averages not less than two movement distances that are referred. The control device 10 uses the average of the movement distances as the misalignment amount.

The robot system 2 may include a sensor 31. The sensor 31 may detect the misalignment of the joined body 50. The sensor 31 includes at least one of an image sensor, a photoelectric sensor, a laser sensor, an ultrasonic sensor, or an infrared sensor.

When the sensor 31 detects misalignment, the processing device 12 may perform the following processing. After completing the inspection processing for the first weld portion 53 of one joined body 50, the control device 10 refers to the movement distance of the position adjustment (step S26) of the inspection processing. The control device 10 uses the referenced movement distance as the misalignment amount. The control device 10 shifts the prescribed position of the detector 22 for the other weld portions 53 by the amount of referred movement distance for only the inspection processing of the one joined body 50.

When misalignment of the joined body 50 is detected, the time necessary for the inspection processing of the joined body 50 can be reduced by shifting the prescribed position according to the misalignment amount.

Figure 16:
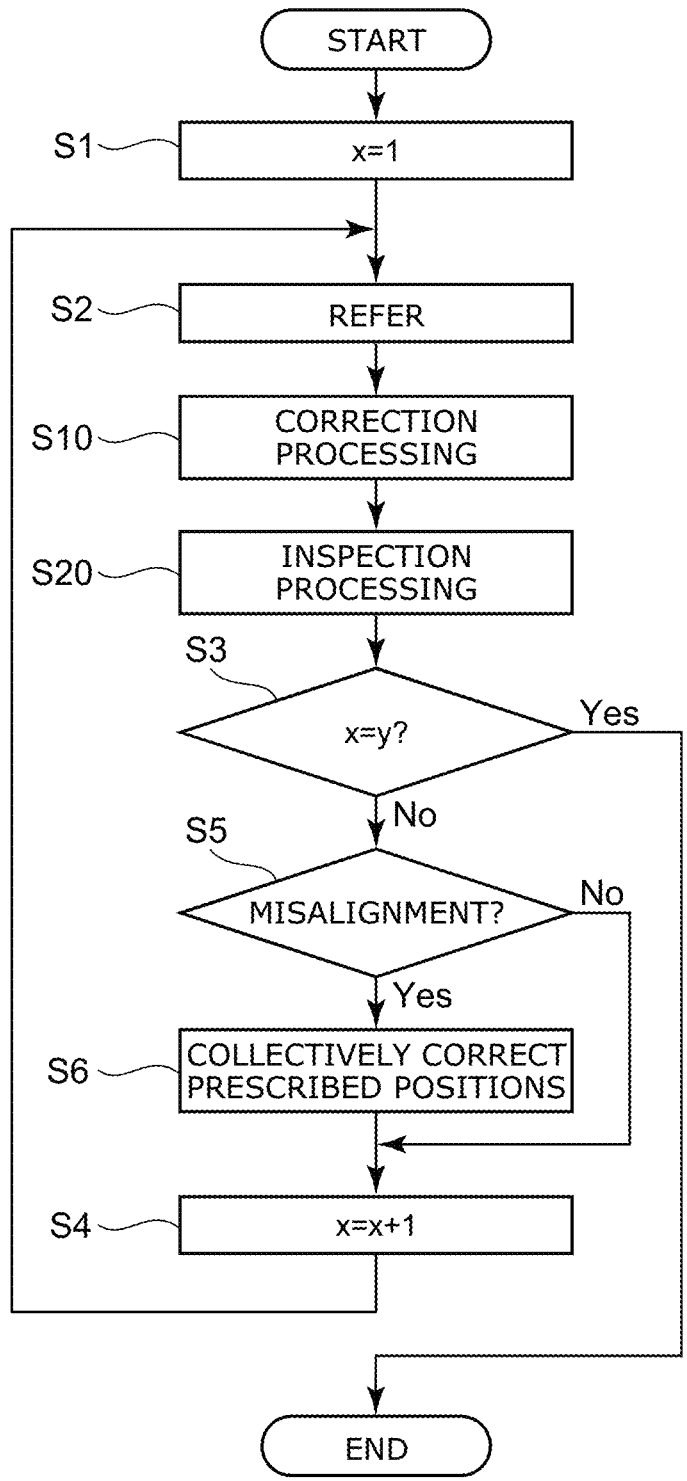
FIG. 16 is a flowchart showing processing according to a robot system according to a second modification of the embodiment.

FIG. 16 is a flowchart showing processing according to a robot system according to a second modification of the embodiment.

Compared to the flowchart shown in FIG. 10, the flowchart shown in FIG. 16 further includes steps S5 and S6. In step S5, the control device 10 determines whether or not misalignment exists. The existence of the misalignment may be determined based on the results of multiple position adjustments, or may be determined based on the detection result of the sensor 31. When misalignment exists, the control device 10 collectively corrects the prescribed positions of the detector 22 for the other weld portions 53 in step S6.

The timing at which steps S5 and S6 are performed is modifiable as appropriate. For example, steps S5 and S6 may be performed during the correction processing or during the inspection processing.

When misalignment is detected, it is favorable for the movement distance of the position adjustment to be associated with data indicating the existence of misalignment and then stored. When calculating the reference distance in a subsequent correction processing, the control device 10 excludes the movement distance for the misalignment from the extracted multiple movement distances. The movement distance in the correction processing of a misaligned joined body 50 is large compared to normal. The reference distance easily exceeds the threshold if the reference distance is calculated using the movement distance for the misalignment. There is a possibility that the prescribed position may be uselessly corrected. Also, there is a possibility that the prescribed position may be excessively corrected. By excluding the movement distance for the misalignment, the prescribed position can be more appropriately corrected.

Figure 17:
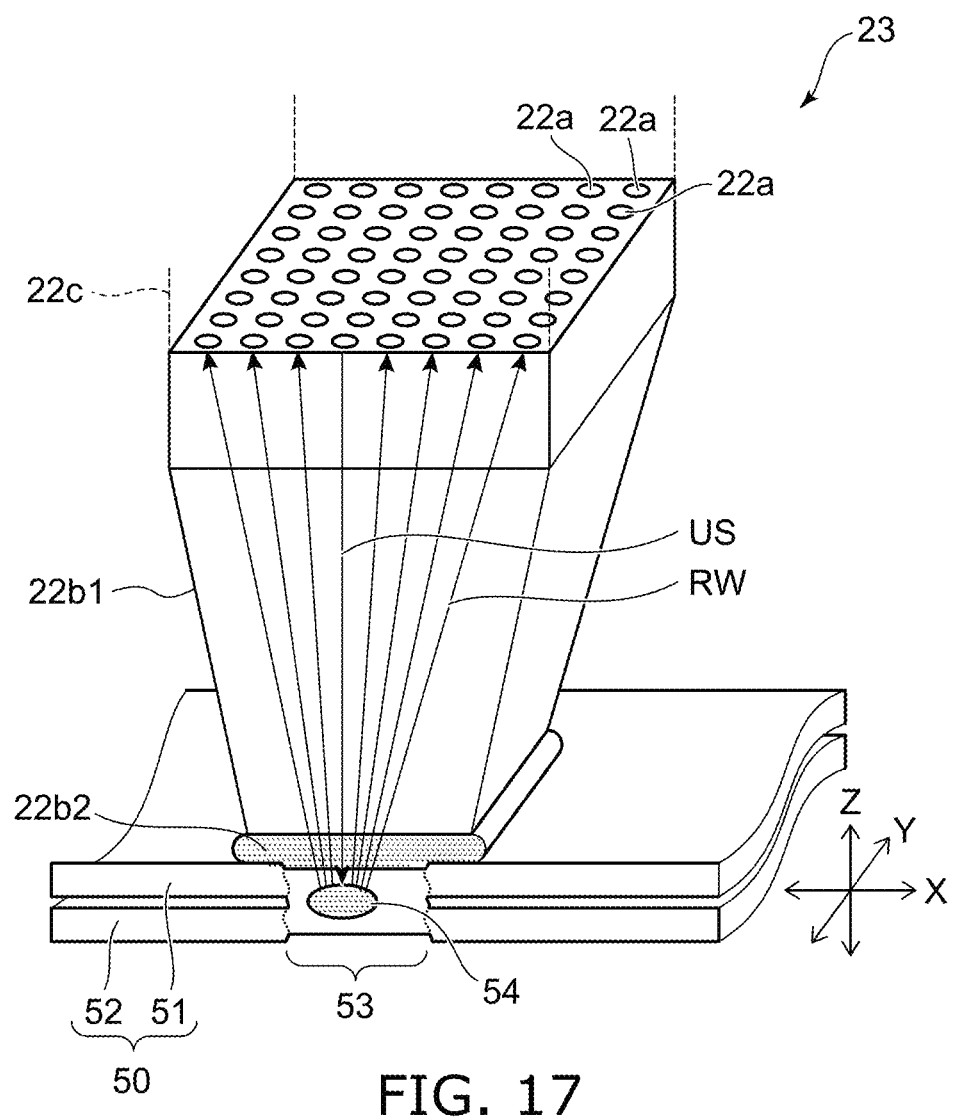
FIG. 17 is a schematic view showing the structure of another detector.

FIG. 17 is a schematic view showing the structure of another detector.

In an example described above, the couplant liquid 55 is used when performing the probe. The couplant liquid 55 is omissible if a propagating member that is deformable according to the shape of the weld portion 53 is included in the detector.

A detector 23 shown in FIG. 17 includes a first propagating member 22$b$1 and a second propagating member 22$b$2. The first propagating member 22$b$1 is mounted to the housing 22$c$ of the detector 23. The ultrasonic wave can propagate through the first propagating member 22$b$1. For example, the first propagating member 22$b$1 contacts the multiple detection elements 22$a$. Or, another member capable of propagating the ultrasonic wave may be located between the first propagating member 22$b$1 and the multiple detection elements 22$a$.

The second propagating member 22$b$2 is mounted to the first propagating member 22$b$1. The second propagating member 22$b$2 may be bonded to the first propagating member 22$b$1 or may be fixed with respect to the first propagating member 22$b$1 by a not-illustrated fixture. The first propagating member 22$b$1 is positioned between the second propagating member 22$b$2 and the multiple detection elements 22$a$. The second propagating member 22$b$2 can propagate the ultrasonic wave. The ultrasonic wave that propagates through the first propagating member 22$b$1 propagates through the second propagating member 22$b$2 and is transmitted outside the detector 23.

The first propagating member 22$b$1 is a solid. The first propagating member 22$b$1 has a sufficient hardness so that substantial modification does not occur even when operating the detector 22. The second propagating member 22$b$2 is a gel but is not a liquid. The second propagating member 22$b$2 is softer than the first propagating member 22$b$1. In other words, the hardness of the second propagating member 22$b$2 is less than the hardness of the first propagating member 22$b$1. Therefore, the second propagating member 22$b$2 deforms easily compared to the first propagating member 22$b$1. The first propagating member 22$b$1 has sufficient softness so that the first propagating member 22$b$1 can deform according to the surface configuration of the object of the inspection when probing.

The first propagating member 22$b$1 and the second propagating member 22$b$2 include resins. As one specific example, the first propagating member 22$b$1 includes acrylic. The second propagating member 22$b$2 includes segmented polyurethane. The acoustic impedance of a general steel plate used in joining is about $4.5 \times 10^7$ (Pa·s/m). It is favorable for the acoustic impedances of the first and second propagating members 22$b$1 and 22$b$2 each to be greater than $1.0 \times 10^5$ (Pas/m) and less than $1.0 \times 10^8$ (Pa·s/m) so that the ultrasonic wave sufficiently propagates between the detector 22 and the joined body 50.

The acoustic impedance can be measured in accordance with JIS A 1405-1 (ISO 10534-1).

Figure 18:
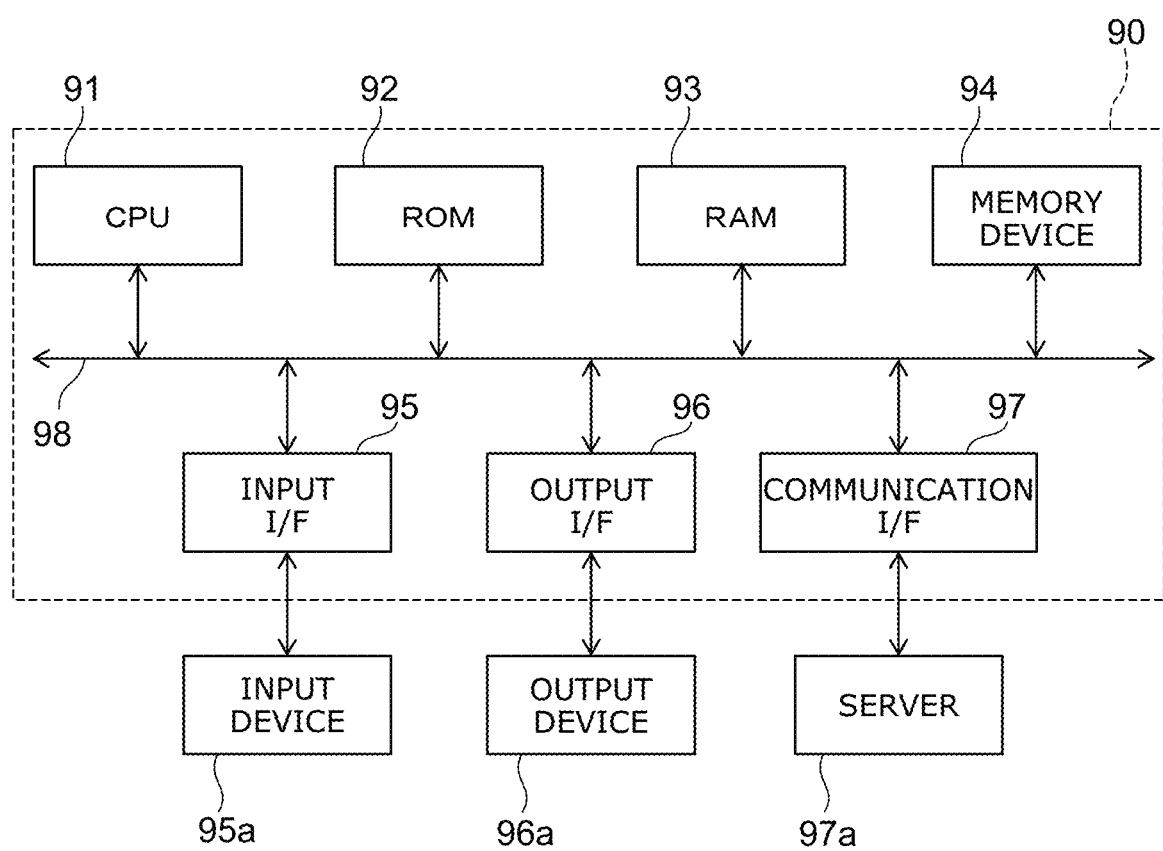
FIG. 18 is a schematic view showing a hardware configuration.

FIG. 18 is a schematic view showing a hardware configuration.

The control device 10, the operation terminal 11, and the processing device 12 each include, for example, the configuration of a computer 90 shown in FIG. 18. The computer 90 includes a CPU 91, ROM 92, RAM 93, a memory device 94, an input interface 95, an output interface 96, and a communication interface 97. The ROM 92 stores programs that control the operations of the computer 90. Programs that are necessary for causing the computer 90 to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 connects the computer 90 and an input device 95$a$. The input I/F 95 is, for example, a serial bus interface such as USB, etc. The CPU 91 can read various data from the input device 95$a$ via the input I/F 95.

The output interface (I/F) 96 connects the computer 90 and an output device 96$a$. The output I/F 96 is, for example, an image output interface such as Digital Visual Interface (DVI), High-Definition Multimedia Interface (HDMI (registered trademark)), etc. The CPU 91 can transmit data to the output device 96$a$ via the output I/F 96 and cause the output device 96$a$ to display an image.

The communication interface (I/F) 97 connects the computer 90 and a server 97$a$ that is outside the computer 90. The communication I/F 97 is, for example, a network card such as a LAN card, etc. The CPU 91 can read various data from the server 97$a$ via the communication I/F 97.

The memory device 94 includes at least one selected from a hard disk drive (HDD) and a solid state drive (SSD). The input device 95$a$ includes at least one selected from a mouse, a keyboard, a microphone (audio input), and a touchpad. The output device 96$a$ includes at least one selected from a monitor and a projector. A device such as a touch panel that functions as both the input device 95$a$ and the output device 96$a$ may be used.

The functions of the control device 10 and the processing device 12 may be realized by the collaboration of three or more computers. The functions of the control device 10 and the processing device 12 may be realized by one computer. The major parts of the various processing described above are modifiable as appropriate between the control device 10 and the processing device 12.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by a computer (or an embedded system). The recording format (the storage format) of the recording medium is arbitrary. For example, the computer reads the program from the recording medium and causes the CPU to execute the instructions recited in the program based on the program. In the computer, the acquisition (or the reading) of the program may be performed via a network.

According to the processing system, the robot system, the control device, the processing method, or the control method described above, the inspection accuracy can be increased while suppressing the time necessary for the inspection processing. Similarly, the inspection accuracy can be increased while suppressing the time necessary for the inspection processing by using a program to cause a computer to perform the processing method or the control method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A processing system, comprising:
   a control device configured to control a detector, the detector including a plurality of detection elements arranged along a first direction and a second direction, the second direction crossing the first direction; and
   a processing device,
   the control device configured to
      set the detector to a prescribed position, and
      cause the detector to perform a probing process of a weld portion of a joined body, the probing process including a transmission of an ultrasonic wave and a detection of a reflected wave,
   the processing device configured to calculate a center position of the weld portion in a first plane along the first and second directions based on intensity data, the intensity data being of an intensity of the reflected wave obtained by the probing process, and
   the control device configured to perform a position adjustment of moving the detector along the first plane to reduce a distance between the center position and a position of the detector in the first plane, wherein
   the control device is configured to
      calculate a reference distance using a plurality of movement distances of the detector in a plurality of previous position adjustments, and
      correct the prescribed position using at least a portion of the plurality of movement distances when the reference distance is greater than a first threshold.

2. The processing system according to claim 1, wherein the control device is configured to calculate the reference distance by averaging the plurality of movement distances or calculating a predicted value based on the plurality of movement distances.

3. The processing system according to claim 1, wherein the control device is configured to calculate the reference distance using the movement distances remaining after an outlier is excluded from the plurality of movement distances.

4. The processing system according to claim 1, wherein the control device is configured to
   determine whether or not misalignment of the joined body exists, and
   calculate the reference distance using the movement distances remaining after excluding, from the plurality of movement distances, the movement distance of the position adjustment of the joined body for which the misalignment is determined to exist.

5. The processing system according to claim 1, wherein the weld portion is provided in a plurality of parts on the joined body,
   the position adjustment, the probing process, and the setting of the prescribed position are performed for each of the weld portions, and
   when misalignment of the one of the joined bodies is detected, an amount of the misalignment is used to correct the prescribed position for at least a portion of the weld portions.

6. The processing system according to claim 1, wherein the control device is configured to set the detector to a prescribed orientation,
   the processing device is configured to calculate a tilt of the detector with respect to the weld portion based on the intensity data, and
   the control device is configured to perform an orientation adjustment by rotating the detector to reduce the tilt.

7. The processing system according to claim 6, wherein the control device is configured to
   calculate a reference angle using a plurality of rotation angles of the detector in a plurality of previous orientation adjustments, and
   correct the prescribed orientation using at least a portion of a plurality of the rotation angles when the reference angle is greater than a second threshold.

8. The processing system according to claim 1, wherein the processing device is configured to inspect the weld portion using the intensity data.

9. The processing system according to claim 1, wherein the processing device is configured to calculate a centroid position of an intensity in the intensity data as the center position.

10. A robot system, comprising:
    the processing system according to claim 1; and
    a robot including
       the detector, and
       a manipulator to which the detector is mounted.

11. A control device, comprising:
    processing circuitry configured to
       cause a detector to perform a probing process of a weld portion of a joined body at a prescribed position, the probing process including a transmission of an ultrasonic wave and a detection of a reflected wave, and
       perform a position adjustment of moving the detector to reduce a distance in a first plane between a center position of the weld portion and a position of the detector, the center position being calculated from a result of the probing process, the first plane being along two-dimensional arrangement directions of a plurality of detection elements included in the detector, wherein the processing circuitry is configured to
calculate a reference distance before the probing process by using a plurality of movement distances of the detector in a plurality of previous position adjustments, and
correct the prescribed position using at least a portion of the plurality of movement distances when the reference distance is greater than a first threshold.

12. The control device according to claim 11, wherein intensity data of an intensity of the reflected wave is acquired in the probing process, and
a centroid position of an intensity in the intensity data is calculated as the center position.

13. A processing method, comprising:
setting a detector to a prescribed position, the detector including a plurality of detection elements arranged along a first direction and a second direction, the second direction crossing the first direction;
causing the detector to perform a probing process of a weld portion of a joined body, the probing process including a transmission of an ultrasonic wave and a detection of a reflected wave;
calculating a center position of the weld portion in a first plane along the first and second directions based on intensity data, the intensity data being of an intensity of the reflected wave obtained by the probing process; and
performing a position adjustment of moving the detector along the first plane to reduce a distance between the center position and a position of the detector in the first plane,
a reference distance being calculated using a plurality of movement distances of the detector in a plurality of previous position adjustments, and
the prescribed position being corrected using at least a portion of the plurality of movement distances when the reference distance is greater than a first threshold.

14. The processing method according to claim 13, wherein
the reference distance is calculated using the movement distances remaining after an outlier is excluded from the plurality of movement distances.

15. The processing method according to claim 13, wherein
the detector is set to a prescribed orientation,
a tilt of the detector with respect to the weld portion is calculated based on the intensity data, and
an orientation adjustment of rotating the detector to reduce the tilt is performed.

16. The processing method according to claim 15, wherein
a reference angle is calculated using a rotation angle of the detector for a plurality of previous orientation adjustments, and
the prescribed orientation is corrected using at least a portion of a plurality of the rotation angles when the reference angle is greater than a second threshold.

17. The processing method according to claim 13, wherein
a centroid position of an intensity in the intensity data is calculated as the center position.

18. A non-transitory computer-readable storage medium storing a program,
the program causing a computer to execute the processing method according to claim 13.

19. A control method, comprising:
causing a detector to perform a probing process of a weld portion of a joined body at a prescribed position, the probing process including a transmission of an ultrasonic wave and a detection of a reflected wave; and
causing a computer to perform a position adjustment of moving the detector to reduce a distance in a first plane between a center position of the weld portion and a position of the detector, the first plane being along two-dimensional arrangement directions of a plurality of detection elements included in the detector,
a reference distance being calculated before the probing process by using a plurality of movement distances of the detector in a plurality of previous position adjustments, and
the prescribed position being corrected using at least a portion of the plurality of movement distances when the reference distance is greater than a first threshold.

20. A non-transitory computer-readable storage medium storing a program,
the program causing a computer to execute the control method according to claim 19.

* * * * *